United States Patent
Abedini et al.

(10) Patent No.: US 12,010,638 B2
(45) Date of Patent: Jun. 11, 2024

(54) SPARSE TRANSMISSION OF DISCOVERY SIGNALS FOR NETWORK ENERGY SAVING

(71) Applicant: QUALCOMM Incorporated, San Diego, CA (US)

(72) Inventors: Navid Abedini, Basking Ridge, NJ (US); Naeem Akl, Somerville, NJ (US); Jianghong Luo, Skillman, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 17/362,686

(22) Filed: Jun. 29, 2021

(65) Prior Publication Data

US 2022/0417875 A1   Dec. 29, 2022

(51) Int. Cl.
*H04W 56/00* (2009.01)
*H04W 52/02* (2009.01)
*H04W 88/14* (2009.01)

(52) U.S. Cl.
CPC ..... *H04W 56/001* (2013.01); *H04W 52/0235* (2013.01); *H04W 88/14* (2013.01)

(58) Field of Classification Search
CPC .......... H04W 56/001; H04W 52/0235; H04W 52/0216; H04W 88/14; Y02D 30/70; H04L 5/0048; H04L 5/0094
See application file for complete search history.

(56) References Cited

U.S. PATENT DOCUMENTS

| 10,979,979 | B1* | 4/2021 | Kong | H04W 56/0025 |
| 2019/0261444 | A1* | 8/2019 | Axmon | H04W 76/28 |
| 2019/0274146 | A1* | 9/2019 | Tang | H04W 24/10 |
| 2019/0350023 | A1* | 11/2019 | Novlan | H04L 5/16 |

(Continued)

FOREIGN PATENT DOCUMENTS

| BR | 112021000232 A2 * | 8/2021 | H04W 24/02 |
| CA | 3056217 A1 * | 3/2020 | G06F 1/3209 |

(Continued)

OTHER PUBLICATIONS

International Search Report and Written Opinion—PCT/US2022/032617—ISA/EPO—dated Oct. 5, 2022.

(Continued)

*Primary Examiner* — Chi H Pham
*Assistant Examiner* — Vladislav Y Agureyev
(74) *Attorney, Agent, or Firm* — Procopio, Cory, Hargreaves & Savitch LLP

(57) ABSTRACT

Aspects presented herein may provide various power saving techniques and features for network nodes by configuring different power saving modes for the network nodes. Aspects presented herein may enable a network node to transmit SSBs less frequently to reduce an amount of power utilized. In one aspect, a base station configures a plurality of SSB Tx periodicities associated with a plurality of ES modes. The base station transmits an indication of the plurality of SSB Tx periodicities associated with the plurality of ES modes. The base station transmits one or more SSBs based on one of the plurality of SSB Tx periodicities associated with one of the plurality of ES modes.

28 Claims, 15 Drawing Sheets

(56) References Cited

U.S. PATENT DOCUMENTS

| | | | |
|---|---|---|---|
| 2020/0022011 A1* | 1/2020 | Lee | H04W 24/10 |
| 2020/0029316 A1* | 1/2020 | Zhou | H04W 74/0833 |
| 2020/0029345 A1* | 1/2020 | Malik | H04W 52/0229 |
| 2020/0053781 A1* | 2/2020 | Pan | H04W 72/30 |
| 2020/0137666 A1 | 4/2020 | Agiwal | |
| 2020/0154446 A1* | 5/2020 | Yerramalli | H04L 5/001 |
| 2020/0245333 A1* | 7/2020 | Lin | H04L 5/10 |
| 2020/0266867 A1* | 8/2020 | Park | H04B 7/0456 |
| 2020/0314738 A1* | 10/2020 | Qi | H04W 76/27 |
| 2020/0314747 A1* | 10/2020 | Zhou | H04L 5/0053 |
| 2020/0337110 A1* | 10/2020 | Kim | H04W 76/28 |
| 2020/0351818 A1* | 11/2020 | Park | H04W 4/90 |
| 2020/0374735 A1 | 11/2020 | Wei et al. | |
| 2021/0112536 A1* | 4/2021 | Shah | H04L 5/0048 |
| 2021/0259044 A1* | 8/2021 | Islam | H04W 52/0229 |
| 2021/0377821 A1 | 12/2021 | Shi et al. | |
| 2022/0038935 A1* | 2/2022 | Xiong | H04L 1/08 |
| 2022/0039032 A1* | 2/2022 | Wei | H04B 7/155 |
| 2022/0046540 A1* | 2/2022 | Kwon | H04W 68/005 |
| 2022/0078758 A1* | 3/2022 | Lee | H04W 72/1263 |
| 2022/0104104 A1* | 3/2022 | Harada | H04W 48/12 |
| 2022/0104154 A1* | 3/2022 | Wei | H04W 36/305 |
| 2022/0116821 A1* | 4/2022 | Wei | H04L 27/2636 |
| 2022/0140975 A1* | 5/2022 | Siomina | H04L 5/0051 370/329 |
| 2022/0166568 A1* | 5/2022 | Kim | H04L 5/005 |
| 2022/0167254 A1* | 5/2022 | Miao | H04W 72/0446 |
| 2022/0174630 A1* | 6/2022 | Wei | H04W 56/0015 |
| 2022/0174766 A1* | 6/2022 | Zhou | H04L 27/26025 |
| 2022/0191863 A1* | 6/2022 | Miao | H04L 5/0094 |
| 2022/0225469 A1* | 7/2022 | Lee | H04W 72/1263 |
| 2022/0312477 A1* | 9/2022 | Niu | H04L 5/0048 |
| 2022/0322234 A1* | 10/2022 | Niu | H04W 52/0232 |
| 2022/0330141 A1* | 10/2022 | Qi | H04W 76/27 |
| 2023/0042702 A1* | 2/2023 | Kim | H04W 8/24 |
| 2023/0121806 A1* | 4/2023 | Li | H04W 24/10 370/329 |
| 2023/0146928 A1* | 5/2023 | Hwang | H04W 52/367 370/329 |
| 2023/0232354 A1* | 7/2023 | Cui | H04W 76/28 370/350 |

FOREIGN PATENT DOCUMENTS

| | | | | |
|---|---|---|---|---|
| CN | 113826410 A | * | 12/2021 | |
| EP | 4002916 A1 | * | 5/2022 | H04W 48/10 |
| EP | 4135418 A1 | * | 2/2023 | |
| WO | WO-2020041421 A1 | * | 2/2020 | H04L 5/0044 |
| WO | WO-2020143718 A1 | * | 7/2020 | H04B 17/30 |
| WO | WO-2020164373 A1 | * | 8/2020 | H04W 24/02 |
| WO | WO-2020222293 A1 | * | 11/2020 | H04B 7/155 |
| WO | WO-2021026704 A1 | * | 2/2021 | |
| WO | WO-2021104038 A1 | * | 6/2021 | |
| WO | WO-2021160166 A1 | * | 8/2021 | H04W 72/085 |
| WO | WO-2022020060 A1 | * | 1/2022 | |
| WO | WO-2022035514 A1 | * | 2/2022 | |

OTHER PUBLICATIONS

Qualcomm Incorporated: "(TP for NR_IAB BL CR to TS 38.473) F1AP-PHY layer Configuration", 3GPP TSG-RAN WG3 Meeting #107-e, R3-200415, 3rd Generation Partnership Project (3GPP), Mobile Competence Centre, 650, Route Des Lucioles, F-06921, Sophia-Antipolis Cedex, France, vol. RAN WG3, No. Electronic Meeting, Feb. 24, 2020-Mar. 6, 2020, Feb. 14, 2020, XP051854090, Sections 1, 2.2, 2.4, 8.2.3.2, 8.3.4,9.3.x.y+4, 9.3.1.10, 69 Pages.

* cited by examiner

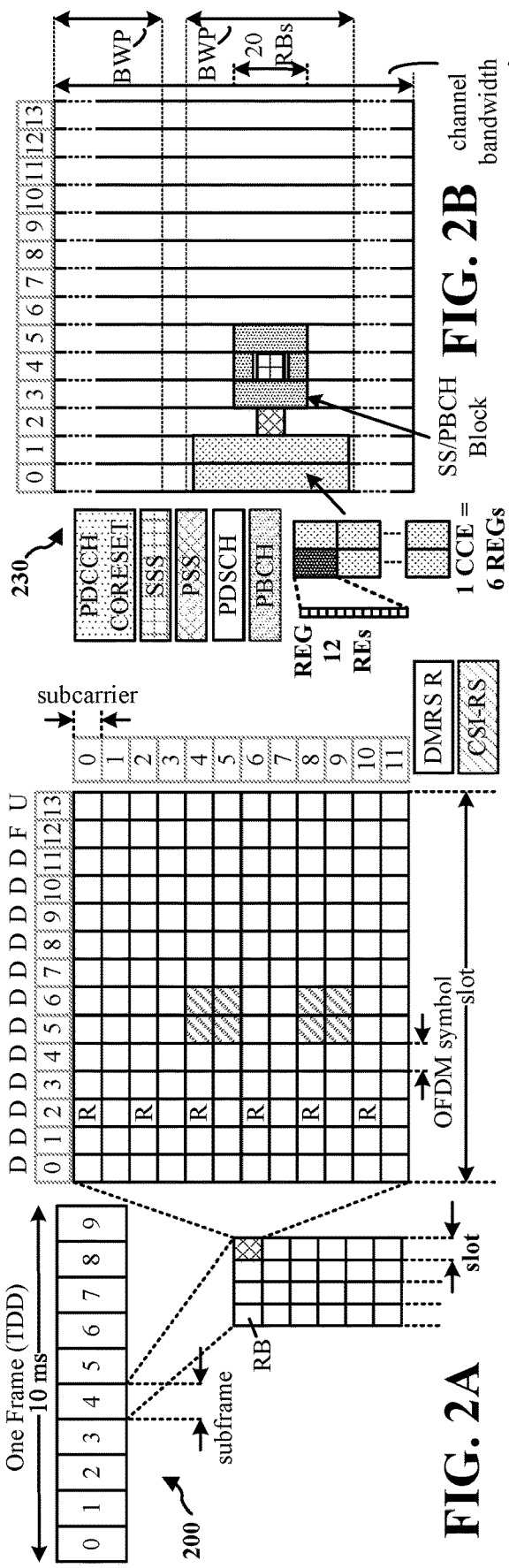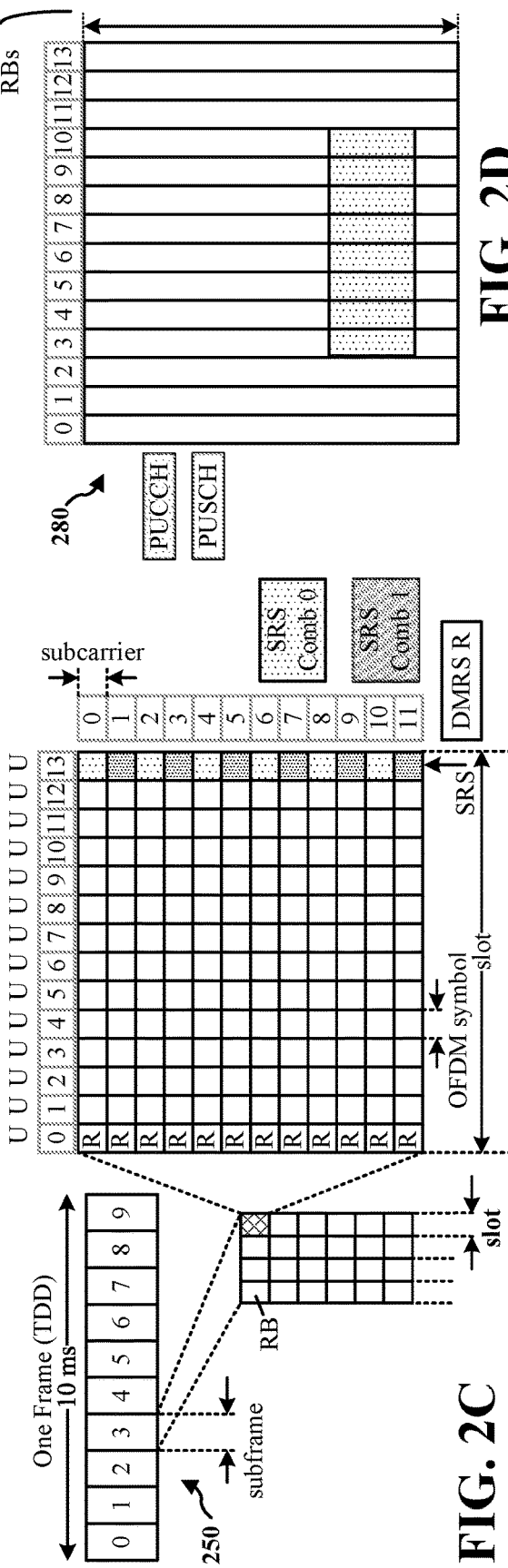
FIG. 2A
FIG. 2B
FIG. 2C
FIG. 2D

SPARSE TRANSMISSION OF DISCOVERY SIGNALS FOR NETWORK ENERGY SAVING

TECHNICAL FIELD

The present disclosure relates generally to communication systems, and more particularly, to wireless communication involving discovery signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus configures a plurality of synchronization signal block (SSB) transmission (Tx) periodicities associated with a plurality of energy saving (ES) modes. The apparatus transmits an indication of the plurality of SSB Tx periodicities associated with the plurality of ES modes. The apparatus transmits one or more SSBs based on one of the plurality of SSB Tx periodicities associated with one of the plurality of ES modes.

In an aspect of the disclosure, a method, a computer-readable medium, and an apparatus are provided. The apparatus receives an indication of a plurality of SSB Tx periodicities associated with a plurality of ES modes. The apparatus receives one or more SSBs based on one of the plurality of SSB Tx periodicities associated with one of the plurality of ES modes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
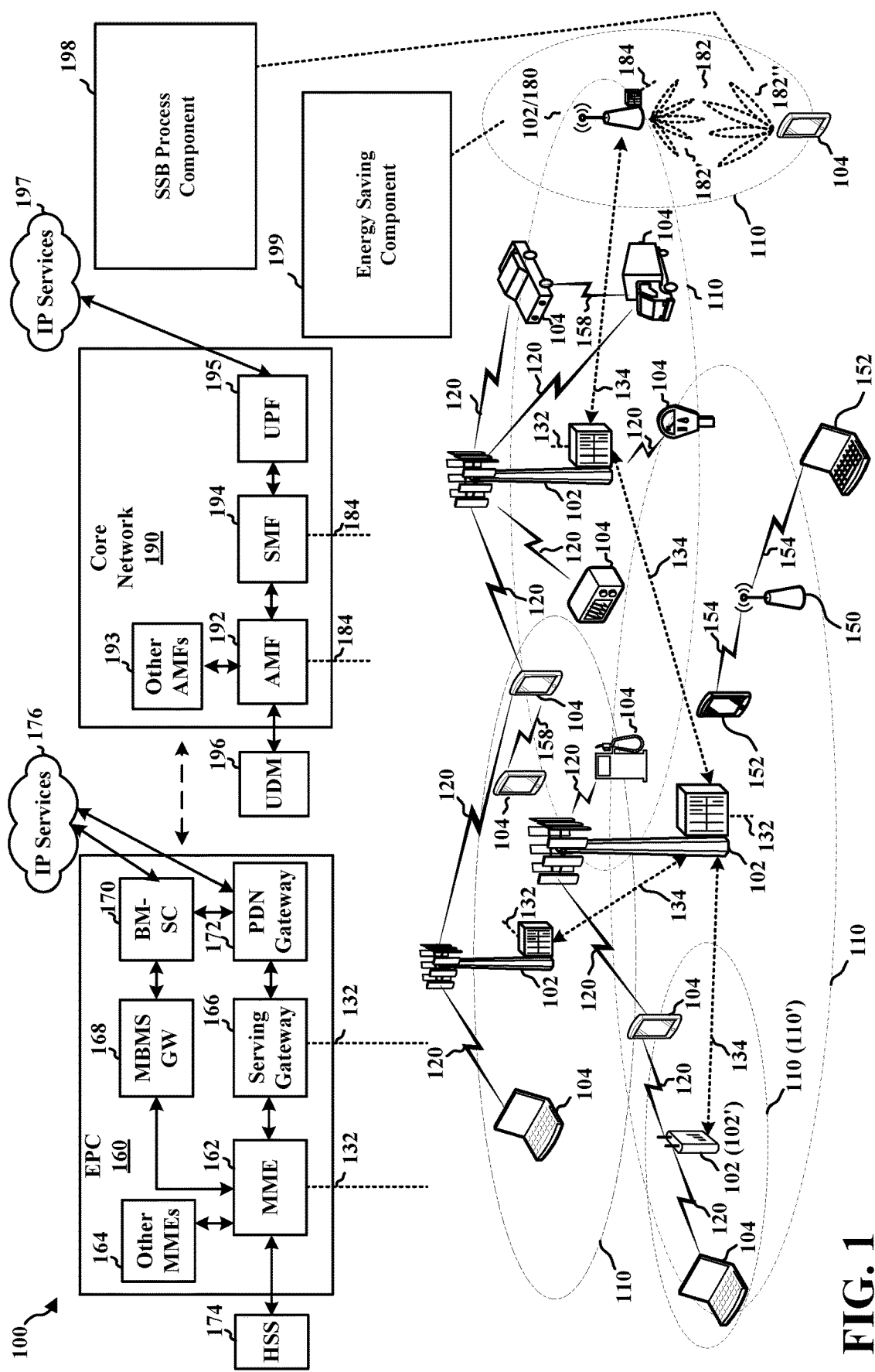
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

Aspects presented here may provide various power saving techniques and features for one or more transmitting entities (e.g., base stations, TRPs, cells, etc.). Aspects presented herein may enable network nodes to save energy by configuring different power saving modes for the network nodes. For example, in one aspect of the present disclosure, one or more cells may be configured with at least one saving mode. Under the energy saving mode, the cell may transmit SSBs less frequently to reduce the time-domain footprint of periodic SSBs, and to enable more detection of DTX.

In certain aspects, the base station 102/180 may include an energy saving component 199 configured to apply different SSB Tx periodicities to SSB transmissions based on different ES modes. In one configuration, the energy saving component 199 may be configured to configure a plurality of SSB Tx periodicities associated with a plurality of ES modes. In such configuration, the energy saving component 199 may transmit an indication of the plurality of SSB Tx periodicities associated with the plurality of ES modes. In such configuration, the energy saving component 199 may transmit one or more SSBs based on one of the plurality of SSB Tx periodicities associated with one of the plurality of ES modes.

In certain aspects, the UE 104 may include an SSB process component 198 configured to receive SSBs at different periodicities. In one configuration, the SSB process component 198 may be configured to receive an indication of a plurality of SSB Tx periodicities associated with a plurality of ES modes. In such configuration, the SSB process component 198 may receive one or more SSBs based on one of the plurality of SSB Tx periodicities associated with one of the plurality of ES modes.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SC S) and, effectively, the symbol length/duration, which is equal to 1/SCS.

| $\mu$ | SCS<br>$\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
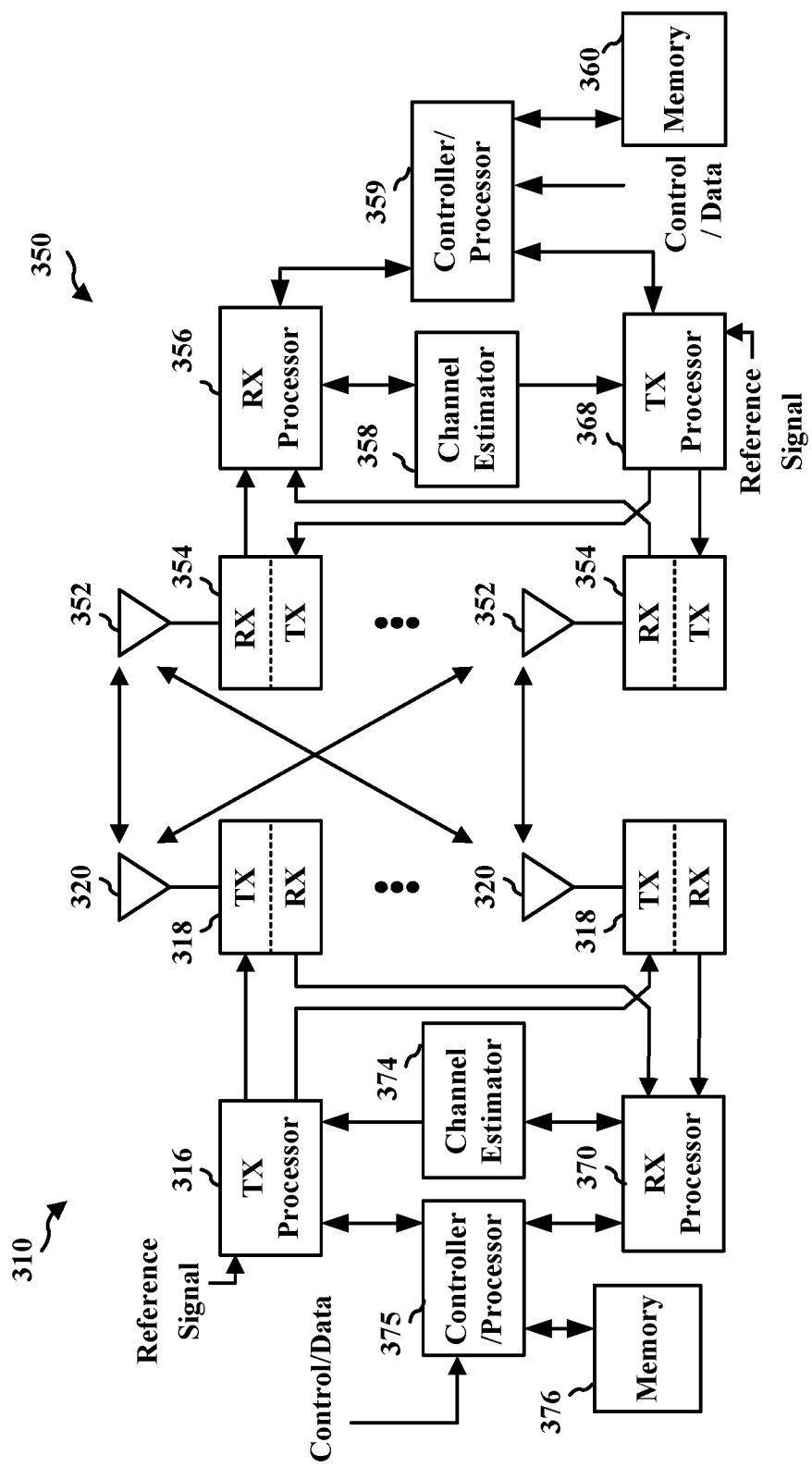
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physic al channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the SSB process component 198 of FIG. 1.

At least one of the TX processor 316, the RX processor 370, and the controller/processor 375 may be configured to perform aspects in connection with the energy saving component 199 of FIG. 1.

A UE may perform a cell search to obtain time and/or frequency synchronization with a cell (e.g., a base station) and to obtain a cell identifier (ID), such as physical layer cell ID (PCI) of the cell. The UE may also learn the signal quality and other information about the cell based on the PCI. The UE may perform the cell search for a defined frequency range before the UE selects or re-selects a cell. In some examples, a UE may perform the cell search when the UE is powered ON, when the UE is moving (e.g., under the mobility in connected mode), and/or when the UE is in an idle/inactive mode (e.g., the UE may perform a cell reselection procedure after the UE camps on a cell and stays in the idle mode), etc.

To perform the cell search (e.g., the initial cell search and/or the cell reselection, etc.), a UE may use/decode synchronization signal(s) transmitted from one or more cells, where the UE may obtain or derive information related to the one or more cells and/or their access information based on the synchronization signal(s). In one example, a cell may transmit one or more types of synchronization signals, such as a primary synchronization signal (PSS) and a secondary synchronization signal (SSS), along with a physical broadcast channel (PBCH), in a synchronization signal block (SSB) to UEs within its transmission range, e.g., as described in connection with FIG. 2B. The UE may perform the cell search based on the SSB. In some examples, a UE may first decode a PBCH before the UE may receive other system information transmitted on a physical downlink shared channel (PDSCH).

Figure 4:
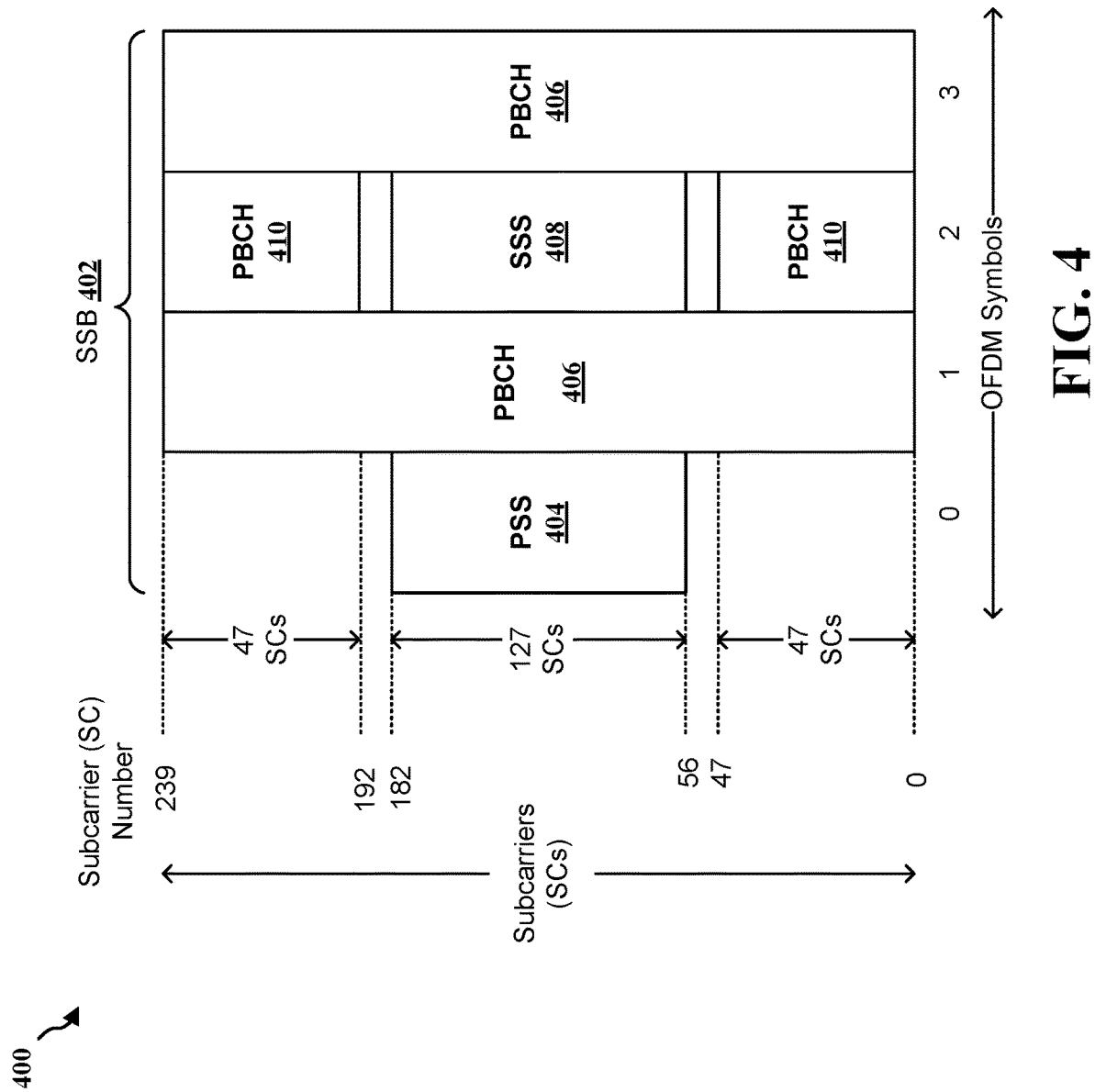
FIG. 4 is a diagram illustrating an example synchronization signal block (SSB) in accordance with various aspects of the present disclosure.

FIG. 4 is a diagram 400 illustrating an example SSB in accordance with various aspects of the present disclosure. An SSB 402 may span four (4) OFDM symbols with one (1) symbol for a PSS 404, two (2) symbols for PBCH 406, and one (1) symbol with an SSS 408 and PBCH 410 that are frequency division multiplexed (FDMed). The length of an OFDM symbol or a slot may be scaled with subcarrier spacing (SCS), and there may be seven (7) or fourteen (14) symbols per slot. For example, different frequency ranges may have different SCS, where 15, 30, and/or 60 kHz SCS may be used for the lower frequency bands (e.g., the FR1), and 60, 120, and/or 240 kHz SCS may be used for the higher frequency bands (e.g., the FR2). In one example, the PSS 404 may be mapped to 127 subcarriers (SCs) around the center frequency of the SSB 402, where the PSS 404 may use a length 127 frequency domain-based M-sequence (e.g., made up of 127 M-sequence values), which may have up to three (3) possible sequences. The M-sequence may also be referred to as a maximum length sequence (MLS), which may be a type of pseudorandom binary sequence. The SSS 408 may also be mapped to 127 SCs and may use a length 127 frequency domain-based Gold Code sequence (e.g., two (2) M-sequences are used), which may have up to 1008 possible sequences. A UE may use the information included in the PSS 404 and/or the SSS 408 for downlink frame synchronization and for determining the physical cell ID of the cell. The PBCH 406 and/or 410 may be modulated with quadrature phase shift keying (QPSK), which may be coherently demodulated by a UE using the associated DMRS carried in the PBCH 406 and/or 410. The PBCH 406 and/or 410 may include the master information block (MIB) part of the MAC layer broadcast channel (BCH). The other part of the BCH, such as the system information block (SIB), may be included in a PDSCH allocation encoded with the system information-radio network temporary identifier (SI-RNTI).

During an initial cell search or a cell reselection, a UE searching for a cell may use a sliding window and correlation technique to look for the PSS 404. For example, the UE may use a sliding window with a length of one (1) symbol to try to correlate one or more possible PSS sequences as the UE may not know which SCs are used by the PSS 404. In addition, due to the Doppler, internal clock frequency shifts, and/or other frequency errors associated with the PSS 404, the UE may use different timing hypothesis and/or frequency hypothesis to account for these errors. For example, for each timing hypothesis, the UE may try to use all three sequences+N frequency hypothesis to account for the Doppler, internal clock frequency shifts, and any other frequency errors, etc.

In some examples, the timing and/or frequency for a PSS (e.g., the PSS 404) may not be known to a UE. As such, a UE may use the PSS for symbol timing and/or initial frequency offset estimations. The cell ID ($N_{ID}^{cell}$) of a cell may be in two parts, where $N_{ID}^{cell}=3N_{ID}^{(1)}+N_{ID}^{(2)}$. The PSS may include the cell ID part 2 ($N_{ID}^{(2)}$), which may have one (1) out of three (3) possible values, e.g., $N_{ID}^{(2)}=0, 1, 2$. After the UE decodes the PSS, the UE may know the estimated timing and/or the frequency for an SSS (e.g., the SSS 408) associated with the PSS. Then, the UE may search for or correlate the associated SSS based on the estimated timing and/or the frequency. The SSS may include the cell ID part 1 ($N_{ID}^{(1)}$), which may have one (1) out of 366 possible values. The SSS may be based on two M-sequences (e.g., the Gold Code sequence), where an M-sequence may be a pseudo-random binary sequence which may be created by cycling through every possible state of a shift register of length n, resulting in a sequence of length $2^n-1$. For example, the SSS may include two cyclic shifts:

$$m_0 = \left(3\left\lfloor\frac{N_{ID}^{(1)}}{112}\right\rfloor + N_{ID}^{(2)}\right)5 \text{ and } m_1 = \left(N_{ID}^{(1)} \bmod 112\right),$$

where the indices $m_0$ and $m_1$ may be derived from the $N_{ID}^{(2)}$ to determine the cyclic shifts.

Referring back to FIG. 4, based on the PSS 404 and/or the SSS 408, the UE may know the timing and/or frequency of the PBCH 406 and 410 (collectively as the PBCH) within the SSB 402. The PBCH may include 576 resource elements (REs) (e.g., 1 RE=1 SC×1 symbol), where 576 REs=240×2 (at symbols one and three)+(48+48) (at symbols two)=number of REs. The PBCH may carry the MIB and DMRS, and the PBCH may be modulated with QPSK. The UE may perform coherent demodulation of the PBCH based on the DMRS carried in the PBCH. In addition, the UE may use the DMRS to perform channel estimation. In one example, the DMRS may carry, or be used by the UE to determine, three (3) least significant bits (LSB) (e.g., for the FR2) of an SSB index per half frame from a DMRS sequence index. For example, under the FR2, a base station or one or more transmission reception points (TRPs) of a base station may communicate with a UE using more than one beam (e.g., up to 64 beams), where each beam may correspond to one beam index. In some examples, each beam index may further be associated with an SSB index, such that the base station may indicate to the UE which beam(s) may be used by the base station for transmission through the SSB index. As a base station or TRP(s) of a base station may use up to 64 beams, the SSB index may be six (6) bits long (e.g., $2^6=64$), where three (3) bits may be carried in the DMRS, and the other three bits may be multiplexed with the PBCH (e.g., as shown by "MSB of SSB index" within FIG. 5). In some examples, the DMRS may be interleaved (e.g., in frequency) with the PBCH data at every $4^{th}$ SC (e.g., RE), such that the DMRS may include 144 REs (e.g., 60×2+12+12). The UE may use the DMRS, the SSS (e.g., 508) and/or the PSS (e.g., 504) signals in an SSB (e.g., 502) to refine the frequency offset estimation.

Figure 5:
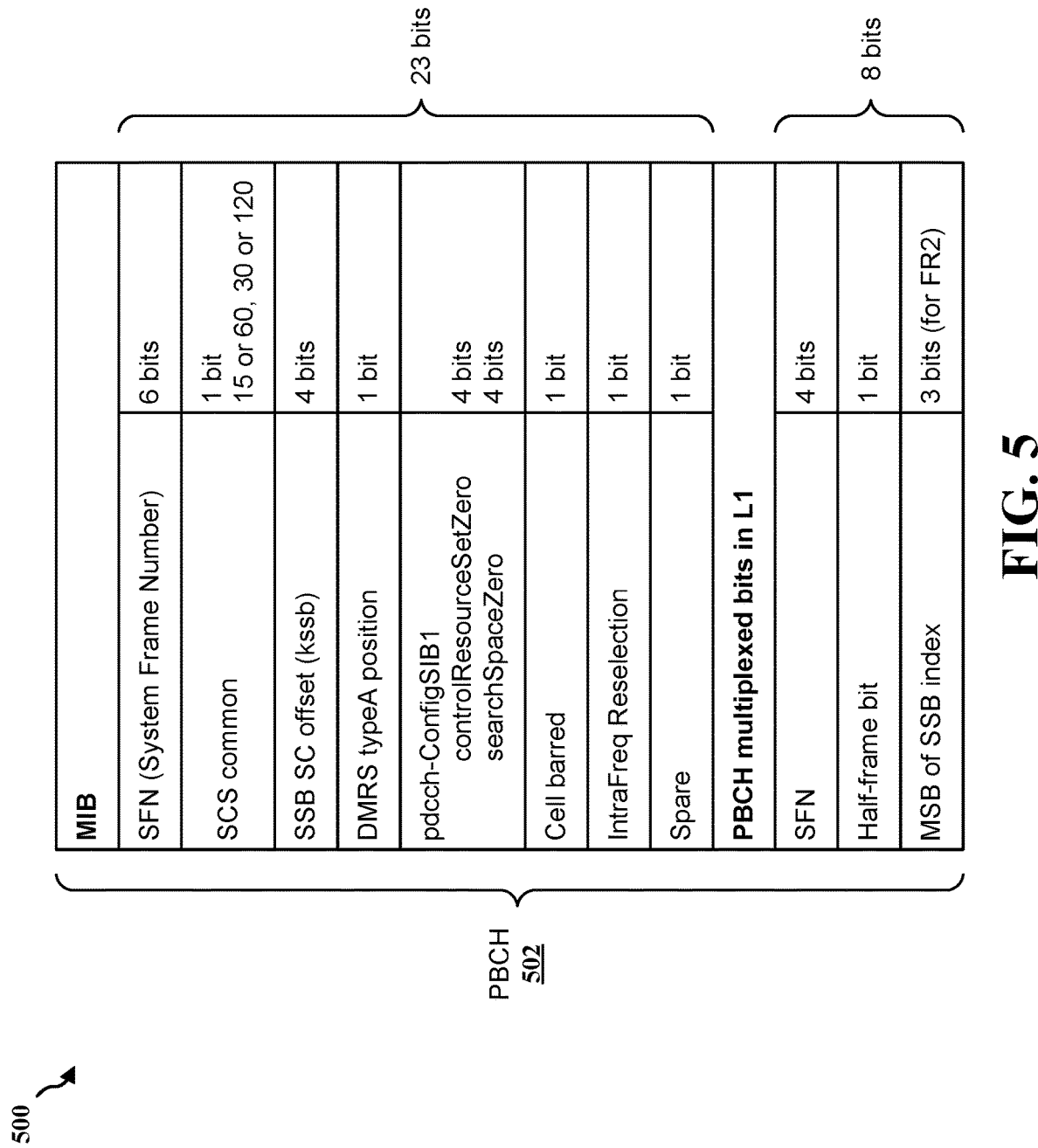
FIG. 5 is a diagram illustrating an example of information that may be included in physical broadcast channel (PBCH) of an SSB in accordance with various aspects of the present disclosure.

FIG. 5 is a diagram 500 illustrating an example of information that may be included in PBCH of an SSB in accordance with various aspects of the present disclosure. A PBCH 502 may be thirty-one (31) bits long, such as for a network operating within the FR2, and the PBCH 502 may include one or more parameters that may be used by a UE to decode a system information block type one (SIB1) message (e.g., SIB1 PDSCH). For example, the MIB within the PBCH 502 may carry apdcch-ConfigSIB1 field that includes a parameter for an initial CORESET (e.g., a controlResourceSetZero parameter) and a parameter for an initial search space set (e.g., a searchSpaceZero parameter). The controlResourceSetZero parameter may guide the UE to a CORESET0, where the CORESET0 may carry a PDCCH that has information for scheduling a SIB1 PDSCH. For example, the controlResourceSetZero parameter may be four (4) bits long, and the UE may use this parameter to determine a multiplexing pattern (discussed below) and the CORESET0's frequency offset, number of resource blocks (RBs) and/or number of symbols, etc. The searchSpaceZero parameter may be four (4) bits long, and the UE may use this parameter to determine the CORESET0's time location. Thus, based on the information included in the controlResourceSetZero parameter and/or the searchSpaceZero parameter, the UE may identify or determine the location (e.g., in time and/or frequency) of the CORESET0.

Figure 6:
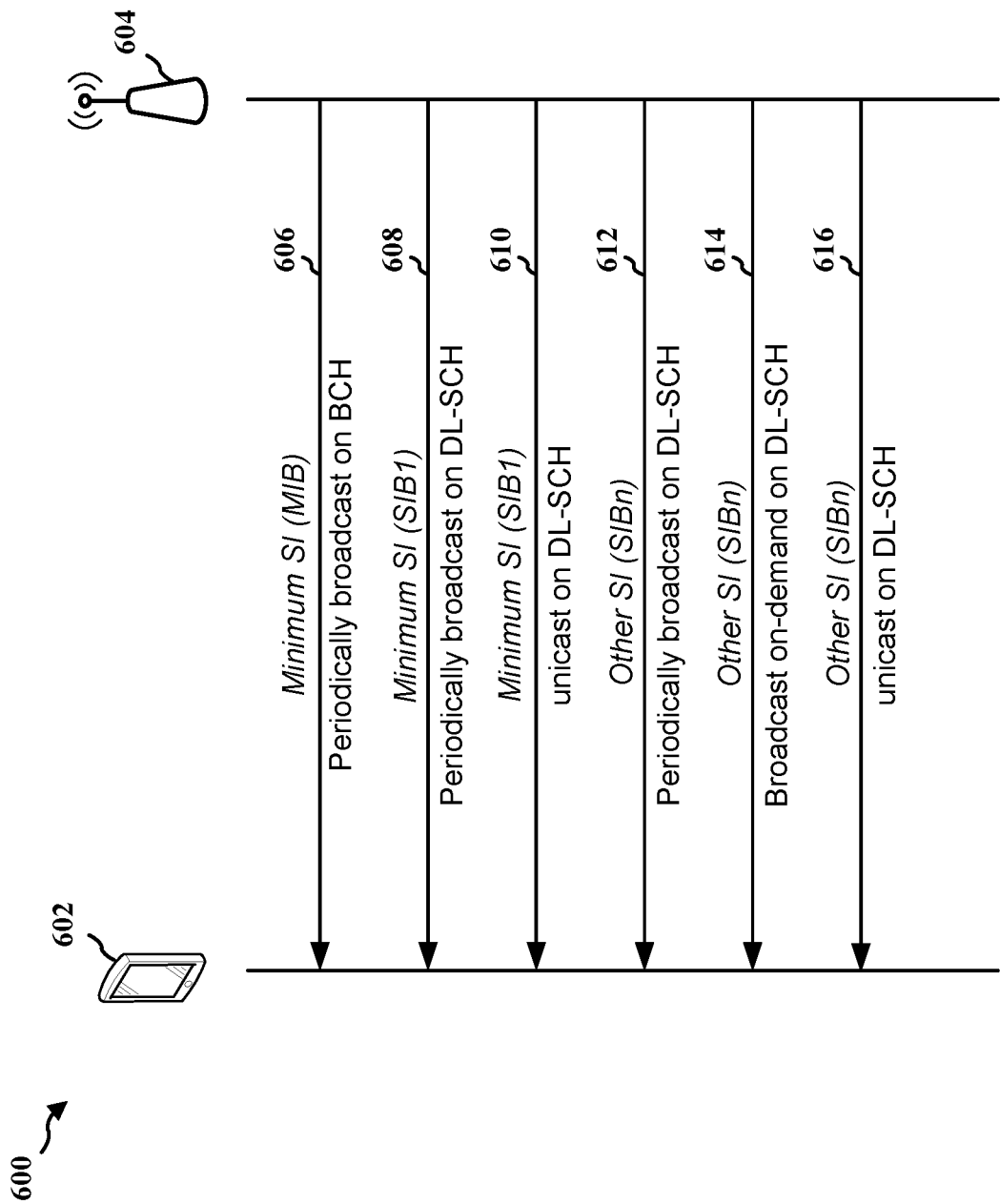
FIG. 6 is a communication flow illustrating an example system information block (SIB) transmissions in accordance with various aspects of the present disclosure.

As described in connection with FIGS. 2B and 4, system information (SI) (e.g., the PBCH) may include a MIB and a number of SIBs. FIG. 6 is a communication flow 600 illustrating example SIB transmissions in accordance with various aspects of the present disclosure. As shown by the communication flow 600, the system information may be divided into multiple minimum SI (e.g., 606, 608, 610) and other SI (e.g., 612, 614, 616). The minimum SI (e.g., 606, 608, 610) may include basic information for a UE 602's initial access to a cell 604 (e.g., base station) and information for acquiring any other system information. For example, minimum SI may include a MIB 606, which may contain cell barred status information and physical layer information of the cell 604 for receiving further system information (e.g., CORESET #0 configuration). The cell 604 may broadcast the MIB 606 periodically on a broadcast channel (BCH). The minimum SI may also include a SIB1 (e.g., 608 and/or 610), where the SIB1 may define the scheduling of other system information blocks and may contain information for the UE's initial access to a base station, such as the random access parameters. For examples, the SIB1 may include information regarding the availability and scheduling of other SIBs (e.g., mapping of SIBs to SI message, periodicity, SI-window size, etc.). The SIB1 may also indicate whether one or more SIBs is provided based on on-demand, in which case, it may also provide PRACH configuration for the UE to request for the SI. The SIB1 may further contain RRC information that is common for all UEs and cell barring information applied to the unified access control. The SIM (e.g., 608 and/or 610) may be referred to as the remaining minimum SI (RMSI), which may be periodically broadcasted by the cell 604 on a downlink-share channel (DL-SCH) (e.g., using SIB1 608) or transmitted to a dedicated UE (e.g., RRC connected) on the DL-SCH (e.g., using SIB1 610). The other SI (e.g., SIBn 612, 614, 616) may include other SIBs not being broadcasted in the minimum SI (e.g., 606, 608, 610). The other SI may be periodically broadcasted by the cell 604 on the DL-SCH, broadcasted on-demand on the DL-SCH (e.g., requested by the UE 602), or transmitted in a dedicated manner on the DL-SCH to one or more UEs including the UE 602. For example, SIB2 may include cell re-selection information, SIB3 may include information about the serving frequency and intra-frequency of the neighboring cells relevant for cell re-selection, etc.

Figure 7:
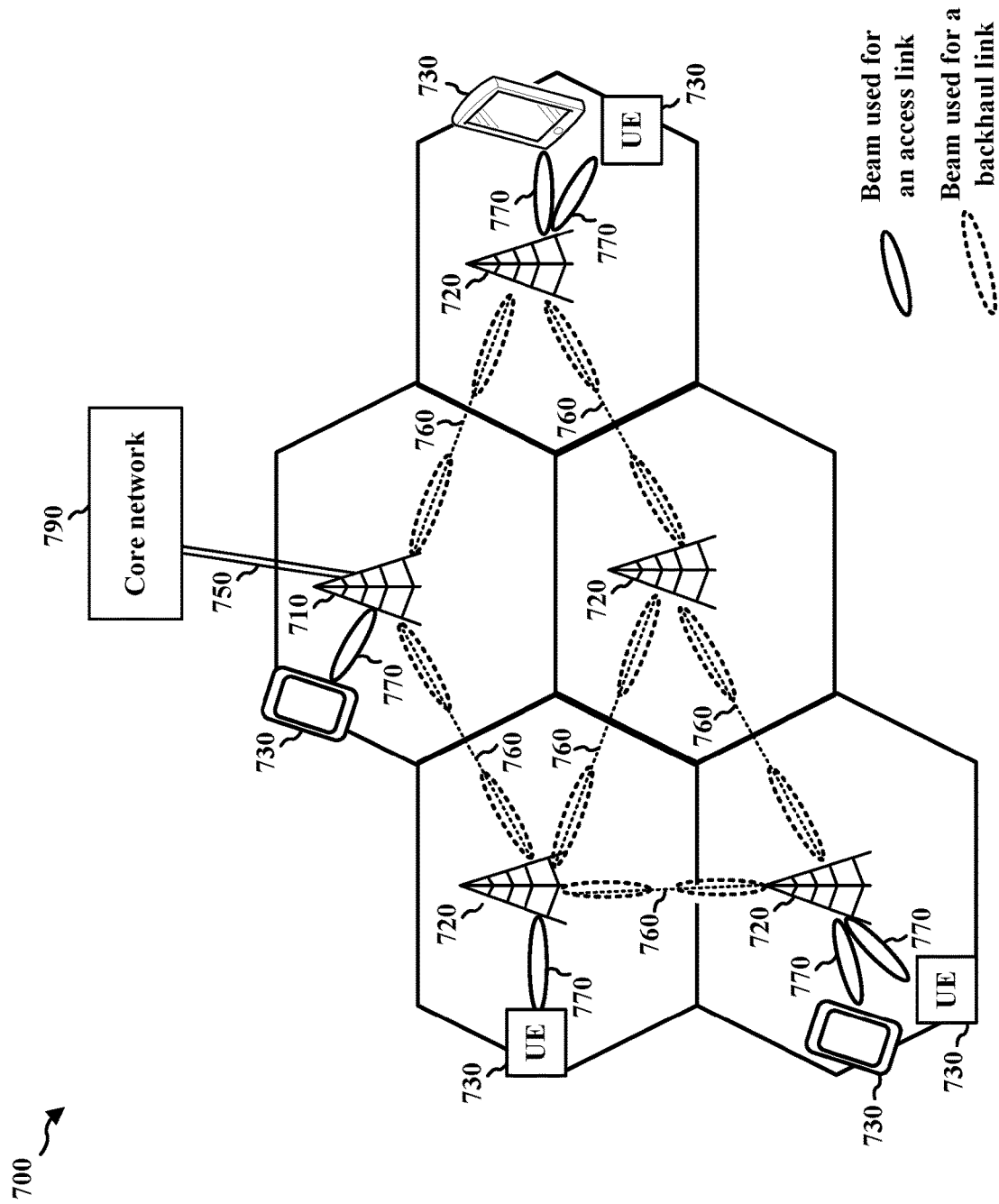
FIG. 7 is a diagram illustrating an example Integrated Access and Backhaul (IAB) network in accordance with various aspects of the present disclosure.

FIG. 7 is a diagram illustrating an example IAB network 700 in accordance with various aspects of the present disclosure. The IAB network 700 may include an anchor node (that may be referred to herein as an "IAB donor") 710 and access nodes (that may be referred to herein as "IAB nodes") 720. The IAB donor 710 may be a base station, such as a base station 102 or 180 described in connection with FIG. 1, and may perform functions to control the IAB network 700. The IAB donor 710 may provide a wireline connection to a core network 790. The IAB nodes 720 may include L2 relay nodes, etc., that relay traffic between the IAB donor 710 and other IAB nodes and/or UEs. Together, the IAB donor 710 and the IAB nodes 720 may share resources to provide an access network and a backhaul network to the core network 790. For example, resources may be shared between access links and backhaul links in the IAB network.

One or more UEs 730 may interface with the IAB nodes 720 or the IAB donor 710 through access links 770. The IAB nodes 720 may communicate with each other and with the IAB donor 710 through backhaul links 760. The IAB donor 710 may be connected to the core network 790 via a wireline backhaul link 750. The UEs 730 may communicate with the core network 790 by relaying messages through their respective access link 770 to the IAB network 700, which then may relay the message through backhaul links 760 to the IAB donor 710 to communicate to the core network 790 through the wireline backhaul link 750. Similarly, the core network may communicate with one of the UEs 730 by sending a message to the IAB donor 710 through the wireline backhaul link 750. The IAB donor 710 may send the message through the IAB network 700 via backhaul links 760 to the IAB node 720 connected to the one or more UEs 730, and the IAB node 720 may send the message to the one or more UEs 730 via the access link 770.

Figure 8:
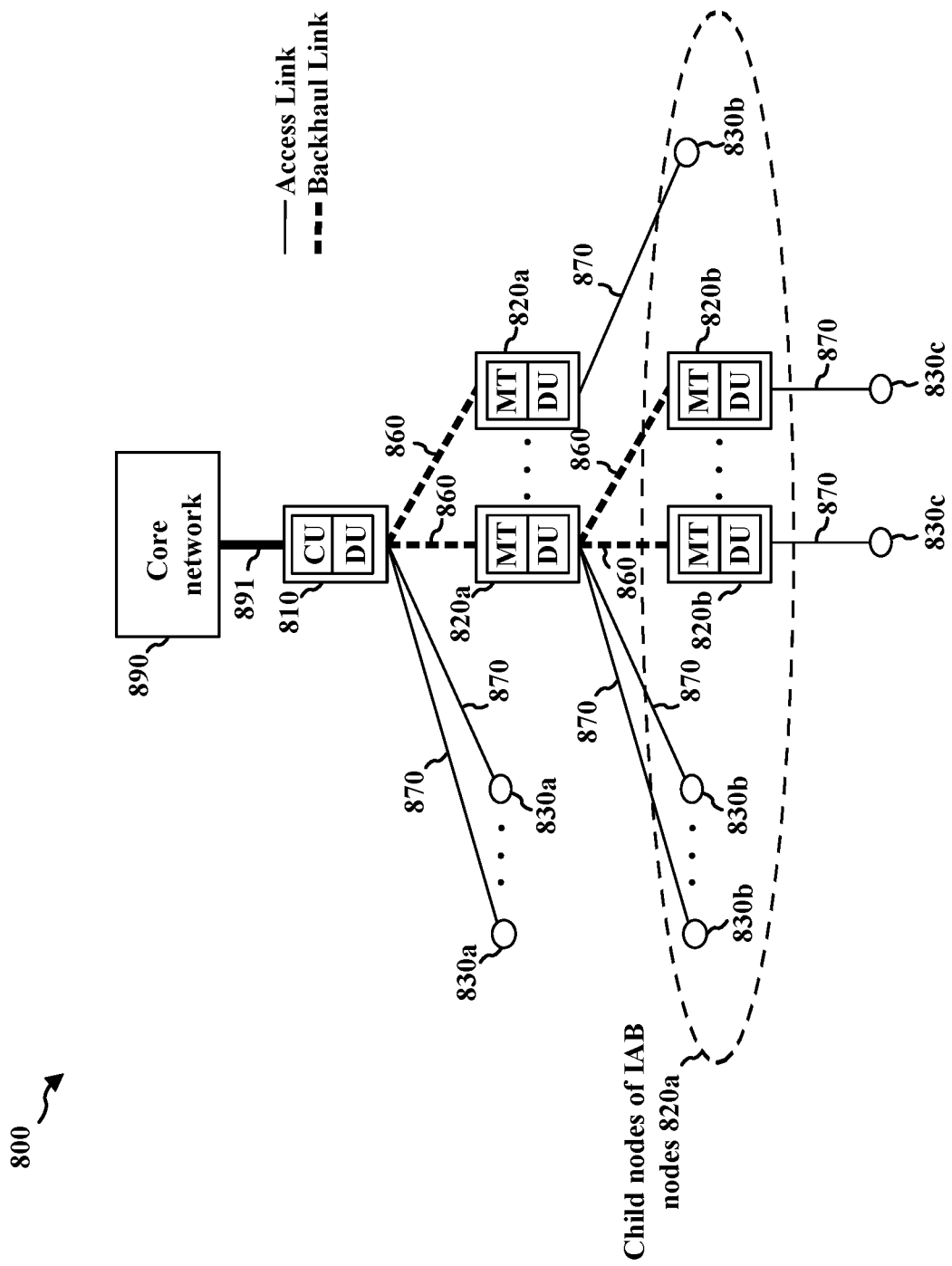
FIG. 8 is a diagram illustrating another example of an IAB network and components thereof in accordance with various aspects of the present disclosure.

FIG. 8 is a diagram illustrating another example of an IAB network 800 and components thereof. The IAB network 800 includes an IAB donor 810 and IAB nodes 820a and 820b. The IAB nodes 820a and 820b, as well as the IAB donor 810, may provide wireless access links 870 to UEs 830a and 830b, respectively.

The IAB donor 810 may be considered a root node of the tree structure of the IAB network 800. The IAB donor 810 may be connected to the core network 890 via a wired connection 891. The wired connection may include, e.g., a wireline fiber. For example, the IAB donor 810 may provide a connection to one or more IAB nodes 820a. The IAB nodes 820a may each be referred to as a child node of the IAB donor 810. The IAB donor 810 may also provide a connection to one or more UEs 830a, which may be referred to as a child UE of the IAB donor 810. The IAB donor 810 may be connected to its child IAB nodes 820a via backhaul links 860, and may be connected to the UEs 830a via access links 870. The IAB nodes 820a that are children nodes of IAB donor 810 may also have IAB node(s) 820b and/or UE(s) 830b as children. For example, IAB nodes 820b may further connect to child nodes and/or child UEs. FIG. 8 illustrates IAB nodes 820b providing an access link to UEs 830c, respectively.

The IAB donor 810 may include a central unit (CU) and a distributed unit (DU). The central unit CU may provide control for the IAB nodes 820a, 820b in the IAB network 800. For example, the CU may be responsible for configuration of the IAB network 800. The CU may perform RRC/PDCP layer functions. The DU may perform scheduling. For example, the DU may schedule resources for communication by the child IAB nodes 820a and/or UEs 830a of the IAB donor 810.

The IAB nodes 820a, 820b may include a mobile termination (MT) and a DU. The MT of IAB node 820a may operate as a scheduled node, scheduled similar to one of the UEs 830a by the DU of the parent node, e.g., IAB donor 810. The MT of IAB node 820b may operate as a scheduled node of parent node 820a. The DU may schedule the child IAB nodes 820b and UEs 830b of the IAB node 820a. As an IAB node may provide a connection to an IAB node that in turn provides a connection for another IAB node, the pattern of a parent IAB node including a DU that schedules a child IAB node/child UE may continue.

Figure 9:
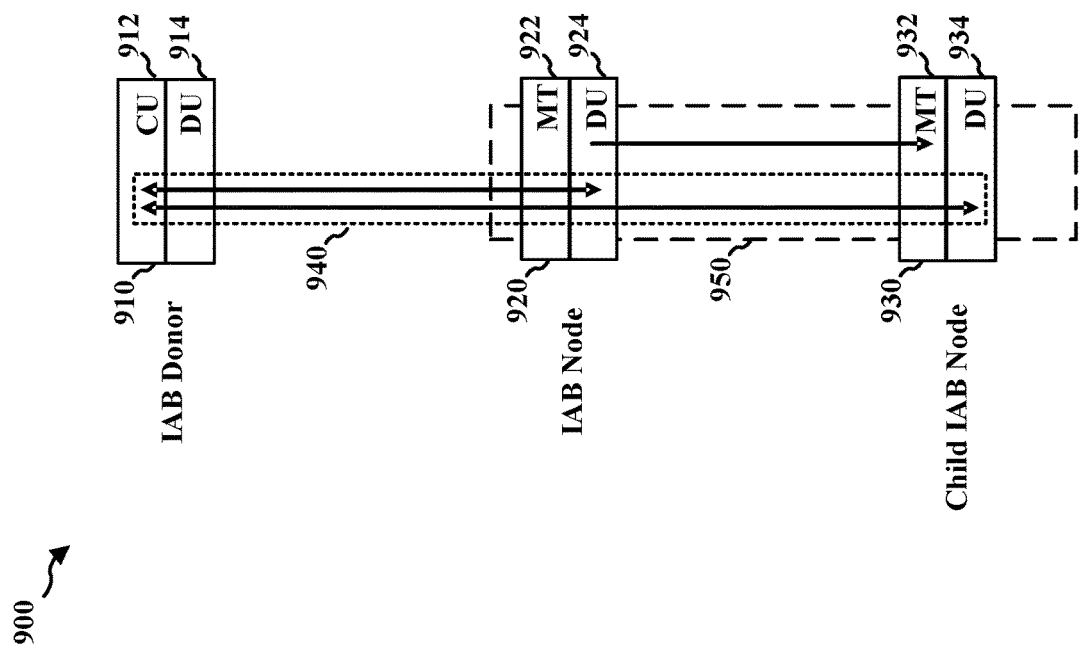
FIG. 9 illustrates examples of interaction between an IAB donor, an IAB node, and a child IAB node in accordance with various aspects of the present disclosure.

FIG. 9 illustrates examples of interaction 900 between an IAB donor 910, an IAB node 920, and a child IAB node 930. The CU 912 of the IAB donor 910 may provide a centralized management of the resources available for communication of the IAB nodes. For example, the CU 912 of the IAB donor 910 may allocate the resources semi-statically. Additionally, or alternatively, the soft resources of a child node may be controlled in a distributed dynamic fashion by the parent of the child node (e.g., the DU 924 or 914 of the parent node). For example, the DU 924 of the IAB node 920 may allocate the soft resources of the child IAB node 930 through dynamic control signaling.

The MTs 922 and 932 may have resources that are downlink (DL) resources, uplink (UL) resources, or flexible (F) resources. In one example, the DUs 914, 924, and 934 may have hard DL resources, hard UL resources, and/or hard F resources. In another example, the DUs 914, 924, and 934 may have soft DL resources, soft UL resources, and/or soft flexible resources. In addition to hard or soft resources types, the DUs 914, 924, and 934 may have resources that are not available (NA) type resources.

The CU 912 of the IAB donor 910 may communicate with the DU 924 of the IAB node 920 and the DU 934 of the child IAB node 930 over an F1 interface 940. The F1 interface 940 may support exchanging information with or transferring encapsulated RRC messages to a child IAB node (e.g., the MT of a child of the receiving IAB node) (e.g., transferring an encapsulated RRC message for the child IAB node 930 to the DU 924 of the IAB node 920). In some aspects, the CU 912 may configure the resource pattern of the DU 924 of the IAB node 920 over the F1 interface 940.

The DU 924 of the IAB node 920 may communicate with the MT 932 of the child IAB node 930 over a Uu air interface 950. The Uu air interface 950 may support transferring RRC messages received from the CU 912 of the IAB donor 910 to the MT 932 of the child IAB node 930, and may support the DU 924 of the IAB node 920 dynamically scheduling the MT 932 of the child IAB node 930. In some aspects, the IAB node 920 may dynamically control the soft resources of the DU 934 of the child IAB node 930 over the Uu air interface 950.

Referring back to FIG. 4, for UEs to discovery a base station based on synchronization (or discovery) signals, such as based on SSBs (e.g., the SSB 402) transmitted from the base station, the base station may be configured to transmit/broadcast the SSBs with a dense periodicity (e.g., every 5 ms, 10 ms, etc.). However, it may take a lot of power for a base station to transmit SSBs continuously and/or at a very short periodicity. Thus, if a region is deployed with multiple base stations, the power consumed by the base stations for transmitting the SSBs at the region may be significant.

In some examples, to provide energy saving for a group of base stations, some of the base stations within the group may be configured to go dormant (e.g., entering into an energy/power saving mode) for a duration, while some of the base station within the group may be configured to operate with an increased transmission power/range (e.g., entering into a compensating mode) to cover the base station(s) that are dormant for the duration. Then, a UE or a MT may be provided with multiple lists of reference signal IDs (e.g., physical cell ID (PCI) lists) to search for, which may correspond to different modes of activity at the neighboring integrated access and backhaul (IAB)-nodes/cells (e.g., one list of active nodes, and another list of dormant nodes, etc.).

In another example, one or more cells and/or IAB nodes may be associated with different levels of power-saving, where different levels of power-saving may provide different transmission (TX) power, periodicity of TX or reception (RX), number of TX/RX occasions per period (e.g., duty cycle), beam sweep configuration for measurement reference signal (RS)/broadcast signals and messages (e.g., number of beams, beam shape, etc.), and/or beam configuration for control/data communication (e.g., beam width), etc. compared to a fully active cell/IAB node (e.g., a cell or an IAB node not in power saving mode).

Aspects presented here may provide various power saving techniques and features for base station. Aspects presented herein may enable network nodes (e.g., cells, base stations) to save energy by configuring different power saving modes for the network nodes. For example, in one aspect of the present disclosure, one or more cells may be configured with at least one saving mode. Under the energy saving mode, the cell may transmit SSBs less frequently (while still making sure they are discoverable) to reduce the time-domain footprint of periodic SSBs, and to enable more detection of discontinuous transmission (DTX). For purposes of the present disclosure a transmitting entity may be referring to a device that is capable of transmitting SSBs. For example, the transmitting entity may be a base station, a cell, a TRP, a CU, and/or a DU, etc. Similarly, a receiving entity may be referring to a device that is capable receiving SSBs. For example, the receiving entity may be a UE, an MT, a CU, and/or a DU, etc.

A cell may be configured with different values for SSB periodicity (e.g., for transmissions and measurements), where the cell may transmit SSBs based on different periodicities under different contexts. For example, for cell-defining SSBs (CD-SSB) (e.g., SSBs for initial access, SSBs that are associated with an RMSI and correspond to an individual cell with a unique NR Cell Global Identifier (NCGI)), a UE may be configured with an initial assumption (e.g., a default value) that CD-SSBs are to be transmitted by a cell at a periodicity of 20 ms, and a MT may be configured with an initial assumption that CD-SSBs are to be transmitted by a cell at a periodicity of 160 ms, etc. A cell may determine and transmit the CD-SSBs at different periodicities, such as a periodicity between 5 ms to 160 ms, and the cell may indicate the periodicity of its SSBs in SIB 1. In some examples, if the SIB1 does not include a periodicity for the SSB, it may indicate that a default value is applied for the periodicity of the SSB (e.g., the periodicity is 5 ms).

A network may provide a receiver (e.g., a UE, an IAB node, etc.) with an SSB based measurement timing configuration (SMTC), where the SMTC may be used by the network to configure receiver measurements on certain resources to reduce the receiver's power consumptions. In other words, a receiver may measure channel condition of a cell based on the SSBs transmitted by the cell, and the periodicity of the measurement may be configured/indicated by the cell or the network via the SMTC. For example, while a cell may transmit SSBs with a periodicity between 5 ms and 160 ms (e.g., 5, 10, 20, 40, 80, and 160 ms etc.), a UE in a connected mode may be configured to receive and/or measure SSBs at a longer periodicity to reduce power consumption compared to a UE not in a connected mode (e.g., a UE that is attempting to connect to a cell), where the periodicity (e.g., the measurement periodicity) may be configured for the UE in the connected mode based on the channel conditions. As such, this may reduce or avoid unnecessary measurements performed by a UE in the connected mode, which may also reduce the UE's power consumption. In one example, the network may provide an SMTC window to a UE to indicate the timing of the SSBs in which the UE may use for cell quality measurements, where the SMTC window periodicity may be set in the same range of SSB (e.g., 5, 10, 20, 40, 80, and 160 ms, etc.) and the SMTC window duration may be set to 1, 2, 3, 4, or 5 ms, according to the number of SSBs transmitted on the cell being measured. When a UE is being notified of an SMTC window, such as by a base station, the UE may detect and measure the SSBs within that SMTC window and report the measurement results back to the base station.

In some examples, the SMTC may include a primary measurement timing configuration (SMTC1), which may provide a timing offset and/or duration for SSB, and the SMTC may also include a secondary measurement timing configuration (SMTC2), which may provide a different timing offset and/or duration for the SSB. The periodicity in the SMTC2 may be configured to be shorter than the periodicity indicated by the SMTC1. For example, in some network configurations, the periodicity indicated by the SMTC1 may range between 5 ms to 160 ms, whereas the periodicity indicated by the SMTC2 may range between 5 ms to 80 ms, etc. In other examples, the SMTC2 may also be configured with a longer periodicity, such as a periodicity between 10 ms and 160 ms (e.g., for SSB-MTC2-LP-r16), and the periodicity may be indicated in SIB2/4 to a UE. In other examples, the SMTC for IAB may indicate a periodicity between 5 ms to 1280 ms.

An IAB-MT may use similar physical channels and procedures that a UE uses in a normal access procedure. For example, for the initial cell search, an IAB-MT may use the same SSB, but with a longer periodicity (e.g., 160 ms) for SSB reception. For random access, additional RACH configurations may be defined for IAB-MTs. In some examples, each IAB-node may be configured to discover and monitor its surrounding IAB-nodes to maintain back-up backhaul links, in the case of a backhaul link failure. Thus, the IAB-node may be configured to measure the SSB transmitted from the other IAB-node (e.g., cell). Similar to SMTC, SSB transmission configuration (STC) may be used by the network or IAB node for configuring the periodicity of IAB-node discovery and measurements. For example, the periodicity for STC may range between 5 ms to 640 ms.

In some examples, a UE's position may be determined/estimated based on measuring SSBs transmitted from multiple transmission reception points (TRPs). For example, a UE may measure SSBs received from multiple TRPs and report the measurements to a serving cell. Based on the measurements, the serving cell may be able to calculate or estimate the location of the UE. In such an example, the periodicity of SSBs transmitted from TRPs may be configured to be between 5 ms to 160 ms. Table 1 below provide an example periodicity ranges for SSBs under different contexts.

TABLE 1

Example Periodicity Ranges for SSBs under Different Contexts

| | Periodicity Range (ms) |
|---|---|
| CD-SSB | 5 to 160 |
| SMTC | SMTC1 = 5 to 160 |
| | SMTC2 = 5 to 80 |
| | Longer Period SMTC2 (SSB-MTC2-LP-r16) = 10 to 160 |
| | IAB SMTC = 5 to 1280 |
| IAB STC | 5 to 640 |
| Positioning TRP SSB | 5 to 160 |

In one aspect of the present disclosure, to reduce energy consumption at a base station, a cell, an IAB node, and/or a TRP (collectively as a "transmitting entity"), SSBs transmitted from a transmitting entity may be configured with longer periodicities. In other words, an energy saving mode may be provided to a transmitting entity that may extend the periodicity in which the SSBs are transmitted from the transmitting entity. In another example, as the maximum periodicity values for SSBs under different contexts may be different (e.g., 80 ms, 160, ms, 640 ms, etc.), a network may be configured to apply/define one maximum periodicity value for SSBs under different contexts.

In one example, a same maximum periodicity may be configured for the IAB STC and the IAB SMTC, such that the maximum periodicity for the IAB STC may be the same as the maximum periodicity for IAB SMTC. For example, the maximum periodicity for IAB STC may be extended from 640 ms to 1280 ms so that it matches the maximum periodicity for IAB SMTC.

In another example, a same maximum periodicity may be configured for the TRP SSB (e.g., for positioning) and the IAB STC. In other words, the periodicities of the TRP SSB may be configured to match IAB STC. For example, if the maximum periodicity for the IAB STC is configured to be 640 ms or 1280 ms, the maximum periodicity for the TRP SSB may also be configured to be 640 ms or 1280 ms, respectively.

In another example, the maximum SSB periodicity indicated in SIB1 may be configured to match a maximum/largest IAB STC periodicity. For example, if the largest ISB STC periodicity is 640 ms or 1280 ms, the maximum SSB periodicity indicated in SIB1 may also be 640 ms or 1280 ms, respectively.

In another example, SMTC configurations used for MT (e.g., SMTC configurations with larger periodicities) may also be used for UEs as well. For example, a same maximum periodicity may be configured for SMTC applied to a UE (e.g., SMTC1, SMTC2, etc.) and SMTC applied to an IAB/MT (e.g., IAB SMTC). In other words, the periodicities of the SMTC1/SMTC2 may be configured to match IAB STC. For example, if the maximum periodicity for the IAB STC is configured to be 640 ms or 1280 ms, the maximum periodicity for the SMTC1/SMTC2 may also be configured to be 640 ms or 1280 ms, respectively. In such an example, an additional or new capability signaling (e.g., UE capability signaling) may be defined for a UE, such that the UE may indicate to the network (or a base station) whether it supports such periodicity (e.g., the extended periodicity). Similarly, in such an example, additional or new indications may be included/defined in SIB2/4 for configuring the extra/extended SMTCs for measuring neighboring cells in energy saving (ES) modes.

In another aspect of the present disclosure, a transmitting entity (e.g., a cell, a base stations, a TRP, etc.) may be configured with one or more ES modes, where different ES modes may be associated with different SSB periodicities. The transmitting entity may switch its ES mode, and as a result change its SSB periodicity. In one example, the transmitting entity may indicate the new value (e.g., the periodicity) associated with the ES mode to one or more receiving entities (e.g., UEs, MTs, etc.) when there is mode switch. In another example, the transmitting entity may indicate multiple SSB periodicity values to one or more receiving entities which may be mapped to different levels/modes of the ES. In other words, the transmitting entity may indicate multiple SSB TX periodicities associated with different ES modes to the one or more receiving entities.

In one example, the indication for multiple SSB TX periodicities associated with different ES modes may be applied to an IAB network (e.g., the IAB network 700, 800, etc.), where the indication may be used by IAB nodes and/or donors for coordination. For example, the indication may be transmitted between a CU and a DU, e.g., from a CU to a DU or from a DU to a CU over an F1 interface. The SSB periodicity values indicated in the indication may be associated with one or more cells or TRPs of the DU and/or one or more cells or TRPs of other (e.g., neighboring) DUs. In another example, the indication for multiple SSB TX periodicities associated with different ES modes may be transmitted between CUs, such as via an Xn interface. In other examples, the indication may be transmitted by a transmitting entity over an Uu interface to one or more UEs and/or MTs to adjust their receiver/searcher algorithms. For example, the indication may be transmitted in SIB1, other SIBs (e.g., SIB2 or 4), and/or a dedicated RRC message.

In another example, the indication for multiple SSB TX periodicities associated with different ES modes may be applied to one or more CUs and/or one or more DUs that are associated with one or more base stations. For example, the indication may be transmitted between a base station CU (e.g., a gNB-CU) and a base station DU (e.g., a gNB-DU), e.g., from a first base station CU to a second base station DU, or from a first base station DU to a second base station CU, etc. In another example, the indication for multiple SSB TX periodicities associated with different ES modes may be transmitted between base station CUs (e.g., between a first base station CU and a second base station CU).

For a periodicity value to be associated with an ES mode, in one example, a transmitting entity may include additional information element(s) and/or flag(s) along with the periodicity values to map the periodicity values to different ES modes. In another example, The ES mode (e.g., when there is a switch to the ES mode) may be assumed to be indicated separately by a transmitting entity. For example, the transmitting entity may transmit an indication for the periodicity associated with an ES mode when the transmitting entity enters into the ES mode. In another example, the ES mode applied by a transmitting entity may be detected by the UEs and/or network nodes (e.g., based on blind detection).

In another aspect of the present disclosure, as each SMTC may have its own configured periodicity, which may be accompanied with a list of PCIs and a common periodicity may be applicable to all the cells in the list, it may be beneficial to enable/provide cells that are in an ES mode with more flexibility in configuring their periodicities.

As such, in one example, an SMTC may include an indication indicating which cell(s) (e.g., neighboring cell(s)) may be in an ES mode, which different cell(s) may be applying the same or different ES modes and/or SSB periodicities. Thus, a receiving entity (e.g., a UE, an MT, etc.) receiving the SMTC may be able to identify the periodicities associated with one or more cells.

In one example, the receiving entity may be preconfigured or support a preconfigured rule to scale the SSB periodicity of the cells in the ES mode. For example, if a receiving entity detects or learns (e.g., via an indication) that a cell is in an ES mode, the receiving entity may apply a preconfigured periodicity for the cell, or applying a scaling factor to the periodicity of the cell, e.g., applying the scaling factor to a default periodicity value associated with the cell or a last periodicity applied by the cell before the cell enters into the ES mode, etc. In another example, a single scaling factor may also be indicated by a transmitting entity along with other parameter(s) of SMTC, such that the single scaling factor may be used by one or more receiving entities to determine the SSB periodicity of ES cells. In another example, a transmitting entity may indicate multiple scaling factors for multiple lists of PCIs to one or more receiving entities. Such configuration may enable a more granular and flexible configuration for receiving entities, and enable different receiving entities to support different levels/modes of ES.

Accordingly, aspects presented herein may enable energy saving for one or more base stations, cells, and/or TRPs by enabling SSB transmission periodicities associated with the one or more base stations, cells, and/or TRPs to be extended and/or modified for different ES modes.

Figure 10:
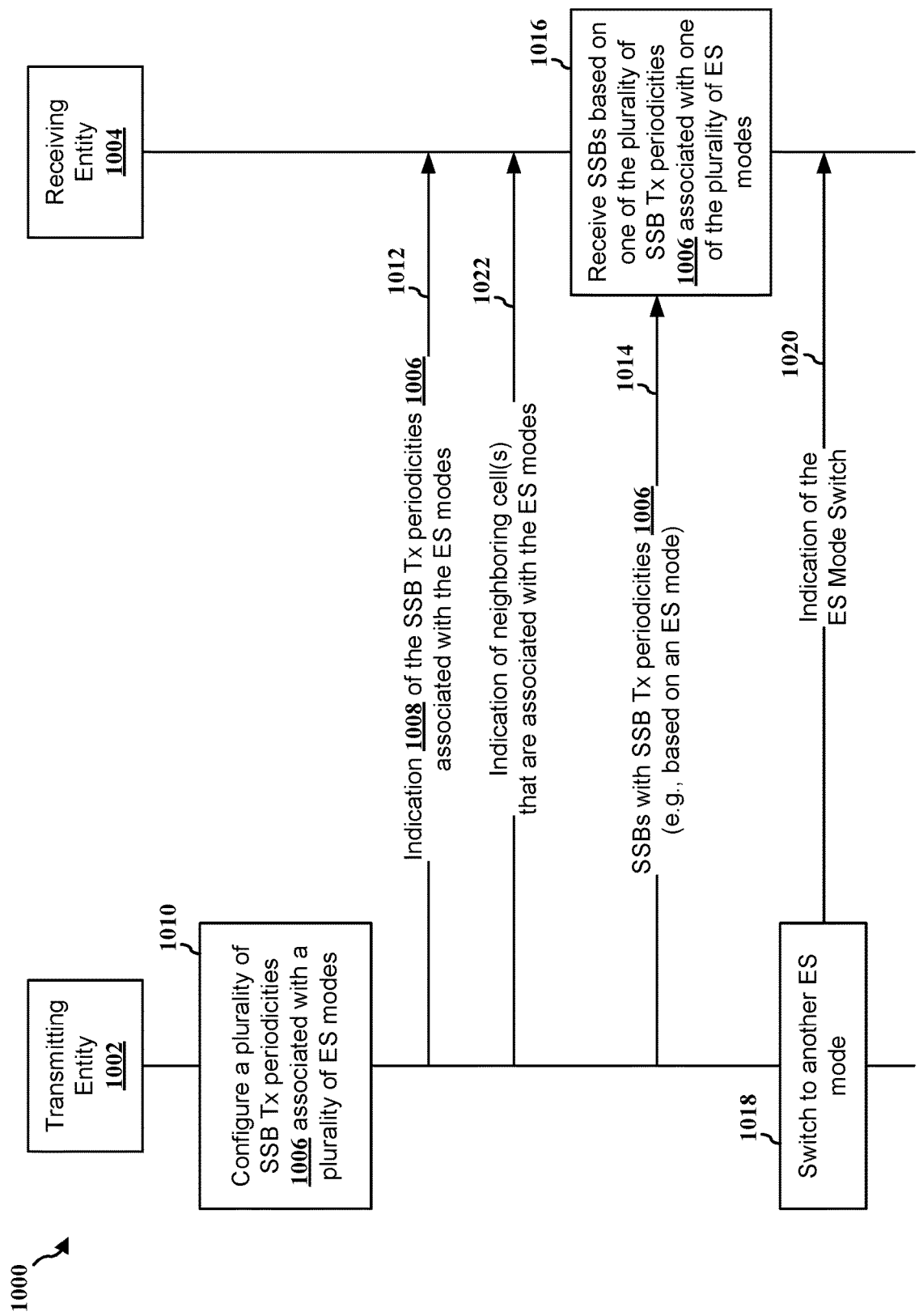
FIG. 10 is a communication flow illustrating an example of transmitting SSBs with different periodicities for energy saving in accordance with various aspects of the present disclosure.

FIG. 10 is a communication flow 1000 illustrating an example of transmitting SSBs with different periodicities for energy saving in accordance with various aspects of the present disclosure. The transmitting entity may include a base station, a cell, a TRP, a CU, and/or a DU, etc., and the receiving entity may include a UE, an MT, a CU, and/or a DU, etc. The numberings associated with the communication flow do not specify a particular temporal order and are merely used as references for the communication flow.

At 1010, a transmitting entity 1002 may configure multiple SSB Tx periodicities 1006 associated with a plurality of ES modes. For example, a first SSB Tx periodicity may be associated with a first ES mode, and a second SSB Tx periodicity may be associated with a second ES mode, etc. The SSB Tx periodicities 1006 may be associated with one or more cells or one or more TRPs of a DU or a base station.

At 1012, the transmitting entity 1002 may transmit an indication 1008 of the multiple SSB Tx periodicities 1006 associated with the plurality of ES modes to a receiving entity 1004. For example, the transmitting entity 1002 may transmit the indication 1008 in one or more formats of a SIB or an RRC message.

At 1014, the transmitting entity 1002 may transmit SSBs based on one of the SSB Tx periodicities 1006 (e.g., based on one of the associated ES modes).

At 1016, after receiving the indication 1008 indicating multiple SSB Tx periodicities 1006 associated with a plurality of ES modes, the receiving entity 1004 may receive SSBs based on one of the SSB Tx periodicities 1006, such as from the transmitting entity 1002.

In one example, as shown at 1018, the transmitting entity 1002 may switch from one ES mode to ES mode, such that the transmitting entity 1002 may transmit SSBs with a different periodicity. In some examples, as shown at 1020, the transmitting entity 1002 may transmit an indication to the receiving entity 1004 indicating that the transmitting entity has switched to another ES mode, such that the receiving entity may become aware of the change in SSB periodicity. In other examples, the receiving entity 1004 may be configured to blind detect the change (e.g., the new SSB periodicity).

In another example, as shown at 1022, the transmitting entity may transmit an indication of one or more neighboring cells that are associated with the ES modes. For example, the indication may include one or more SMTC parameters. In another example, the indication may include one or more scaling factors associated with one or more PCIs.

Figure 11:
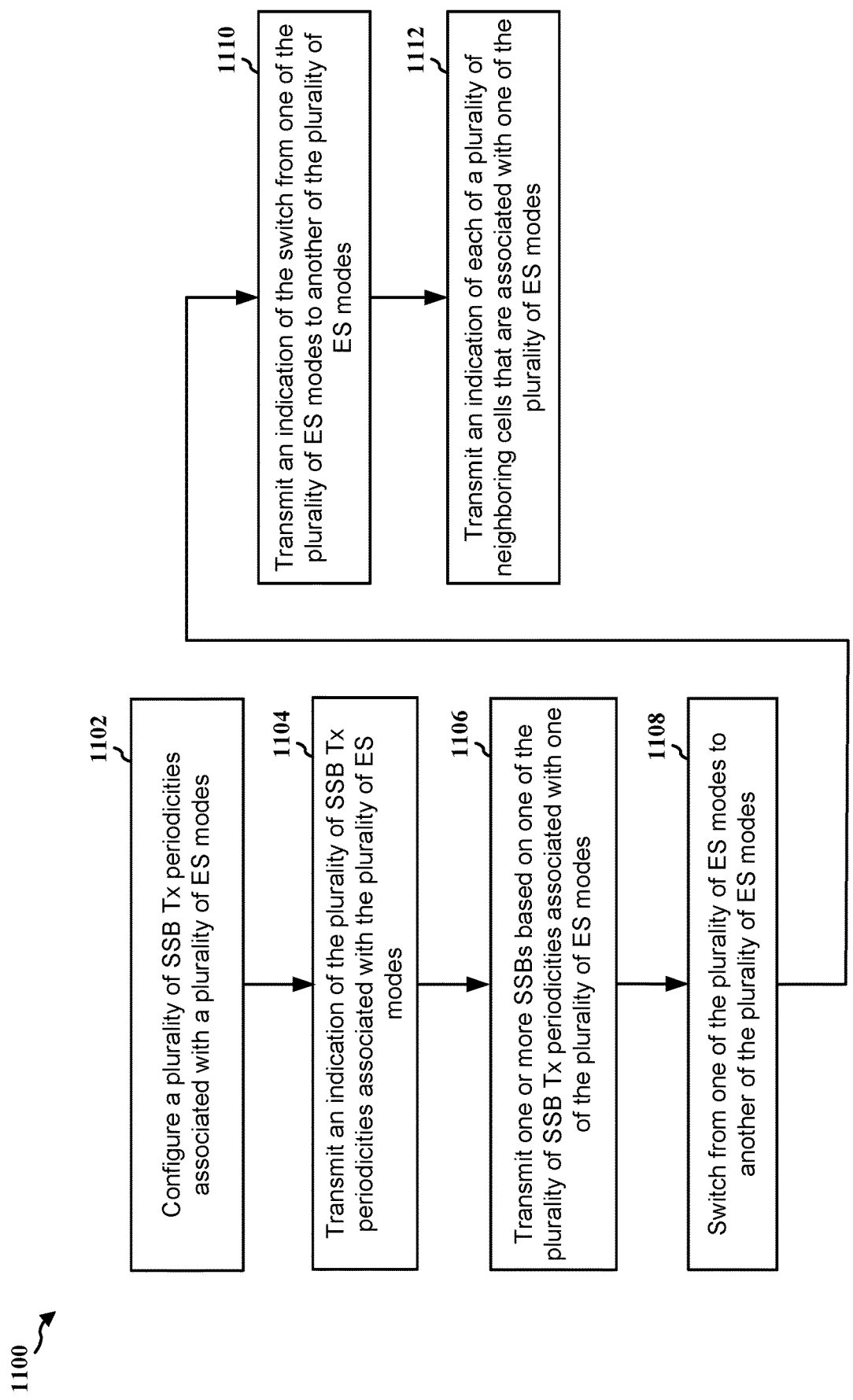
FIG. 11 is a flowchart of a method of wireless communication in accordance with aspects presented herein.

FIG. 11 is a flowchart 1100 of a method of wireless communication. The method may be performed by a base station or a component of a base station (e.g., the base station 102, 180, 310; the transmitting entity 1002; the apparatus 1302; a processing system, which may include the memory 376 and which may be the entire base station 310 or a component of the base station 310, such as the TX processor 316 the RX processor 370, and/or the controller/processor 375). The method may enable the base station to configure and apply different SSB Tx periodicities to SSB transmissions based on different ES modes.

At 1102, the base station may configure a plurality of SSB Tx periodicities associated with a plurality of ES modes, such as described in connection with FIG. 10. For example, at 1010, the transmitting entity 1002 (which may be a base station) may configure a plurality of SSB Tx periodicities 1006 associated with a plurality of ES modes. The configuration of the SSB Tx periodicities may be performed by, e.g., the SSB periodicity configuration component 1340 of the apparatus 1302 in FIG. 13.

At 1104, the base station may transmit an indication of the plurality of SSB Tx periodicities associated with the plurality of ES modes, such as described in connection with FIG. 10. For example, at 1012, the transmitting entity 1002 may transmit indication 1008 of the SSB Tx periodicities associated with the ES modes to the receiving entity 1004. The transmission of the indication of the plurality of SSB Tx periodicities may be performed by, e.g., SSB periodicity indication component 1342 and/or the transmission component 1334 of the apparatus 1302 in FIG. 13.

In one example, the indication may be transmitted from a CU to a DU or transmitted from a DU to a CU. In such an example, the plurality of SSB Tx periodicities may be associated with one or more cells or one or more TRPs of the DU. The CU and/or the DU may be associated with an IAB network, or associated with one or more base stations.

In another example, the indication may be transmitted between CUs, where the CUs may be associated with an IAB network or with one or more base stations.

In another example, the indication may be transmitted to a UE or a MT. In such an example, the indication may be transmitted in one or more formats of a SIB or a RRC message.

At 1106, the base station may transmit one or more SSBs based on one of the plurality of SSB Tx periodicities associated with one of the plurality of ES modes, such as described in connection with FIG. 10. For example, at 1014, the transmitting entity 1002 may transmit SSBs based on SSB Tx periodicities 1006. The transmission of the SSBs may be performed by, e.g., the SSB process component 1344 and/or the transmission component 1334 of the apparatus 1302 in FIG. 13.

At 1108, the base station may switch from one of the plurality of ES modes to another of the plurality of ES modes, such as described in connection with FIG. 10. For example, at 1018, the transmitting entity 1002 may switch to another ES mode. The switching of the ES mode may be performed by, e.g., the ES mode switch component 1346 and/or the transmission component 1334 of the apparatus 1302 in FIG. 13.

At 1110, the base station may transmit an indication of the switch from one of the plurality of ES modes to another of the plurality of ES modes, such as described in connection with FIG. 10. For example, at 1020, the transmitting entity 1002 may transmit an indication to the receiving entity 1004 indicating the ES mode switch. The transmission of the indication for the ES mode switch may be performed by, e.g., the ES mode switch indication component 1348 and/or the transmission component 1334 of the apparatus 1302 in FIG. 13. In such an example, the indication may include one or more SMTC parameters. In such an example, the indication may include one or more scaling factors associated with one or more PCIs.

In another example, the plurality of SSB Tx periodicities include IAB STC periodicities. In such an example, the IAB STC periodicities may be between 640 ms and 1280 ms.

In another example, the plurality of SSB Tx periodicities may include TRP SSB periodicities. In such an example, the TRP SSB periodicities may be configured to match the IAB STC periodicities. In such an example, the TRP SSB periodicities may have a maximum periodicity of 1280 ms.

In another example, the plurality of SSB Tx periodicities in a SIB1 may be configured to match a largest periodicity of the IAB STC periodicity.

At 1112, the base station may transmit an indication of each of a plurality of neighboring cells that are associated with one of the plurality of ES modes, such as described in connection with FIG. 10. For example, at 1022, the transmitting entity 1002 may transmit an indication to the receiving entity 1004 indicating neighboring cell(s) that are associated with the ES modes. The transmission of the indication indicating neighboring cells that are associated with the ES modes may be performed by, e.g., the neighbor cell indication component 1350 and/or the transmission component 1334 of the apparatus 1302 in FIG. 13.

Figure 12:
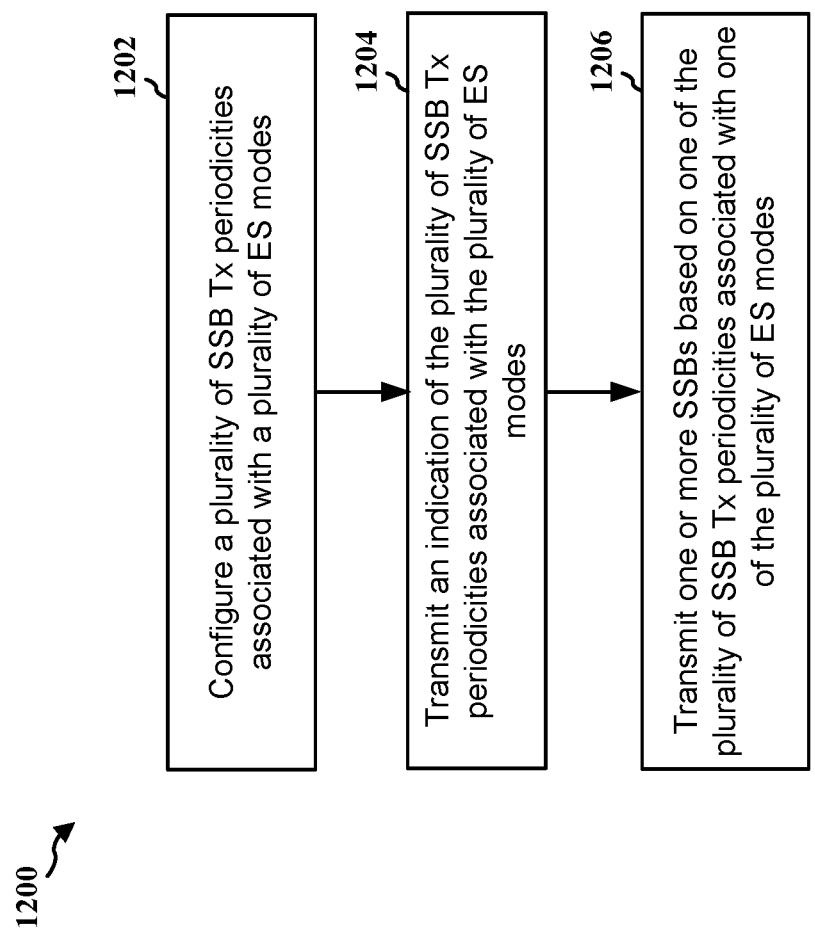
FIG. 12 is a flowchart of a method of wireless communication in accordance with aspects presented herein.

FIG. 12 is a flowchart 1200 of a method of wireless communication. The method may be performed by a base station or a component of a base station (e.g., the base station 102, 180, 310; the transmitting entity 1002; the apparatus 1302; a processing system, which may include the memory 376 and which may be the entire base station 310 or a component of the base station 310, such as the TX processor 316 the RX processor 370, and/or the controller/processor 375). The method may enable the base station to configure and apply different SSB Tx periodicities to SSB transmissions based on different ES modes.

At 1202, the base station may configure a plurality of SSB Tx periodicities associated with a plurality of ES modes, such as described in connection with FIG. 10. For example, at 1010, the transmitting entity 1002 (which may be a base station) may configure a plurality of SSB Tx periodicities 1006 associated with a plurality of ES modes. The configuration of the SSB Tx periodicities may be performed by, e.g., the SSB periodicity configuration component 1340 of the apparatus 1302 in FIG. 13.

At 1204, the base station may transmit an indication of the plurality of SSB Tx periodicities associated with the plurality of ES modes, such as described in connection with FIG. 10. For example, at 1012, the transmitting entity 1002 may transmit indication 1008 of the SSB Tx periodicities associated with the ES modes to the receiving entity 1004. The transmission of the indication of the plurality of SSB Tx periodicities may be performed by, e.g., SSB periodicity indication component 1342 and/or the transmission component 1334 of the apparatus 1302 in FIG. 13.

In one example, the indication may be transmitted from a CU to a DU or transmitted from a DU to a CU. In such an example, the plurality of SSB Tx periodicities may be associated with one or more cells or one or more TRPs of the DU. In such an example, the CU and/or the DU may be associated with an IAB network, or associated with one or more base stations.

In another example, the indication may be transmitted between CUs. In such an example, the CUs may be associated with of an IAB network or with one or more base stations.

In another example, the indication may be transmitted to a UE or a MT. In such an example, the indication may be transmitted in one or more formats of a SIB or a RRC message.

At 1206, the base station may transmit one or more SSBs based on one of the plurality of SSB Tx periodicities associated with one of the plurality of ES modes, such as described in connection with FIG. 10. For example, at 1014, the transmitting entity 1002 may transmit SSBs based on SSB Tx periodicities 1006. The transmission of the SSBs may be performed by, e.g., the SSB process component 1344 and/or the transmission component 1334 of the apparatus 1302 in FIG. 13.

In one example, the base station may switch from one of the plurality of ES modes to another of the plurality of ES modes, such as described in connection with FIG. 10. For example, at 1018, the transmitting entity 1002 may switch to another ES mode. The switching of the ES mode may be performed by, e.g., the ES mode switch component 1346 and/or the transmission component 1334 of the apparatus 1302 in FIG. 13.

In another example, the base station may transmit an indication of the switch from one of the plurality of ES modes to another of the plurality of ES modes, such as described in connection with FIG. 10. For example, at 1020, the transmitting entity 1002 may transmit an indication to the receiving entity 1004 indicating the ES mode switch. The transmission of the indication for the ES mode switch may be performed by, e.g., the ES mode switch indication component 1348 and/or the transmission component 1334 of the apparatus 1302 in FIG. 13. In such an example, the indication may include one or more SMTC parameters. In such an example, the indication may include one or more scaling factors associated with one or more PCIs.

In another example, the plurality of SSB Tx periodicities include IAB STC periodicities. In such an example, the IAB STC periodicities may be between 640 ms and 1280 ms.

In another example, the plurality of SSB Tx periodicities may include TRP SSB periodicities. In such an example, the TRP SSB periodicities may be configured to match the IAB STC periodicities. In such an example, the TRP SSB periodicities may have a maximum periodicity of 1280 ms.

In another example, the plurality of SSB Tx periodicities in a SIB1 may be configured to match a largest periodicity of the IAB STC periodicity.

In another example, the base station may transmit an indication of each of a plurality of neighboring cells that are associated with one of the plurality of ES modes, such as described in connection with FIG. 10. For example, at 1022, the transmitting entity 1002 may transmit an indication to the receiving entity 1004 indicating neighboring cell(s) that are associated with the ES modes. The transmission of the indication indicating neighboring cells that are associated with the ES modes may be performed by, e.g., the neighbor cell indication component 1350 and/or the transmission component 1334 of the apparatus 1302 in FIG. 13.

Figure 13:
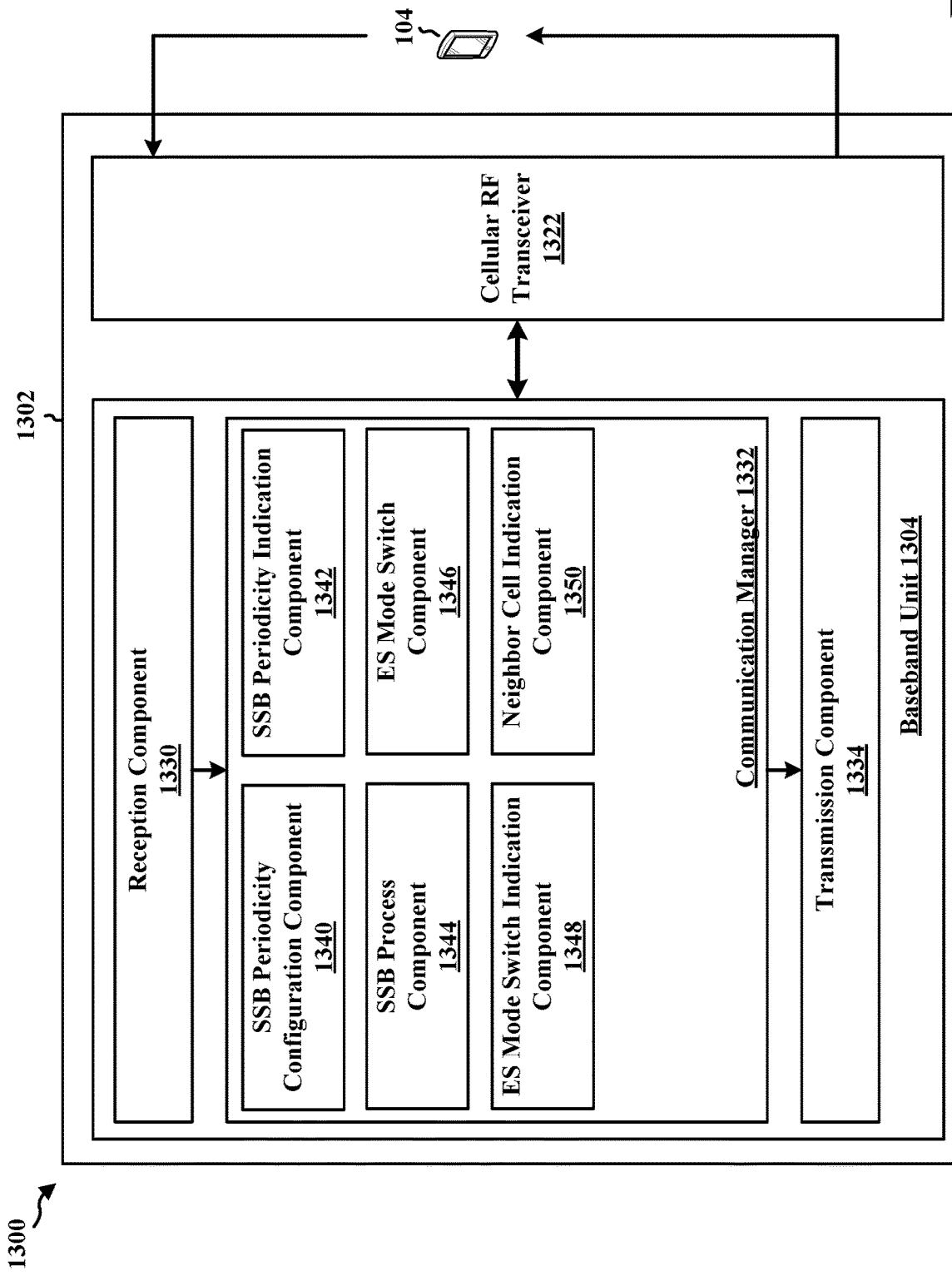
FIG. 13 is a diagram illustrating an example of a hardware implementation for an example apparatus in accordance with aspects presented herein.

FIG. 13 is a diagram 1300 illustrating an example of a hardware implementation for an apparatus 1302. The apparatus 1302 may be a base station, a component of a base station, or may implement base station functionality. In some aspects, the apparatus 1302 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes an SSB periodicity configuration component 1340 that configures a plurality of SSB Tx periodicities associated with a plurality of ES modes, e.g., as described in connection with 1102 of FIGS. 11 and/or 1202 of FIG. 12. The communication manager 1332 further includes an SSB periodicity indication component 1342 that transmits an indication of the plurality of SSB Tx periodicities associated with the plurality of ES modes, e.g., as described in connection with 1104 of FIGS. 11 and/or 1204 of FIG. 12. The communication manager 1332 further includes an SSB process component 1344 that transmits one or more SSBs based on one of the plurality of SSB Tx periodicities associated with one of the plurality of ES modes, e.g., as described in connection with 1106 of FIGS. 11 and/or 1206 of FIG. 12. The communication manager 1332 further includes an ES mode switch component 1346 that switches from one of the plurality of ES modes to another of the plurality of ES modes, e.g., as described in connection with 1108 of FIG. 11. The communication manager 1332 further includes an ES mode switch indication component 1348 that transmits an indication of the switch from one of the plurality of ES modes to another of the plurality of ES modes, e.g., as described in connection with 1110 of FIG. 11. The communication manager 1332 further includes a neighbor cell indication component 1350 that transmits an indication of each of a plurality of neighboring cells that are associated with one of the plurality of ES modes, e.g., as described in connection with 1112 of FIG. 11.

The apparatus may include additional components that perform each of the blocks of the algorithm in the flowcharts of FIGS. 11 and 12. As such, each block in the flowcharts of FIGS. 11 and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for configuring a plurality of SSB Tx periodicities associated with a plurality of ES modes (e.g., the SSB periodicity configuration component 1340). The apparatus 1102 includes means for transmitting an indication of the plurality of SSB Tx periodicities associated with the plurality of ES modes (e.g., the SSB periodicity indication component 1342 and/or the transmission component 1334). The apparatus 1102 includes means for transmitting one or more SSBs based on one of the plurality of SSB Tx periodicities associated with one of the plurality of ES modes (e.g., the SSB process component 1344 and/or the transmission component 1334). The apparatus 1102 includes means for switching from one of the plurality of ES modes to another of the plurality of ES modes (e.g., the ES mode switch component 1346 and/or the transmission component 1334). The apparatus 1102 includes means for transmitting an indication of the switch from one of the plurality of ES modes to another of the plurality of ES modes (e.g., the ES mode switch indication component 1348 and/or the transmission component 1334). The apparatus 1102 includes means for transmitting an indication of each of a plurality of neighboring cells that are associated with one of the plurality of ES modes (e.g., the neighbor cell indication component 1350 and/or the transmission component 1334).

In one configuration, the indication may be transmitted from a CU to a DU or transmitted from a DU to a CU. In such a configuration, the plurality of SSB Tx periodicities may be associated with one or more cells or one or more TRPs of the DU.

In another configuration, the indication may be transmitted between CUs.

In another configuration, the indication may be transmitted to a UE or a MT. In such a configuration, the indication may be transmitted in one or more formats of a SIB or a RRC message.

In another configuration, the indication may include one or more SMTC parameters.

In another configuration, the indication may include one or more scaling factors associated with one or more PCIs.

In another configuration, the plurality of SSB Tx periodicities include IAB STC periodicities. In such a configuration, the IAB STC periodicities may be between 640 ms and 1280 ms.

In another configuration, the plurality of SSB Tx periodicities may include TRP SSB periodicities. In such a configuration, the TRP SSB periodicities may be configured to match the IAB STC periodicities. In such a configuration, the TRP SSB periodicities may have a maximum periodicity of 1280 ms.

In another configuration, the plurality of SSB Tx periodicities in a SIB1 may be configured to match a largest periodicity of the IAB STC periodicity.

The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 14:
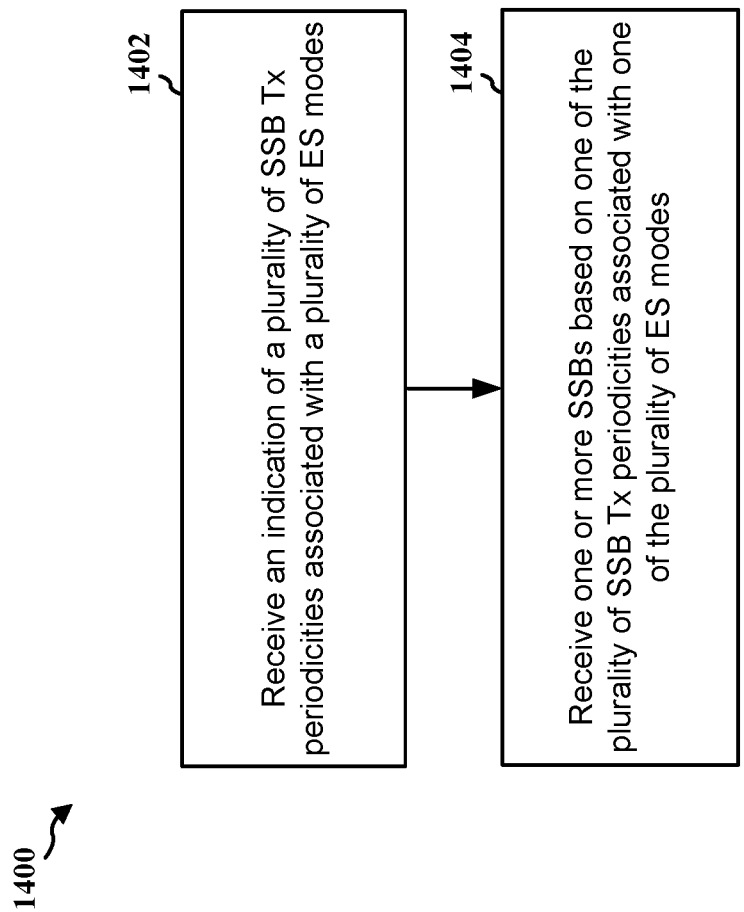
FIG. 14 is a flowchart of a method of wireless communication in accordance with aspects presented herein.

FIG. 14 is a flowchart 1400 of a method of wireless communication. The method may be performed by a UE or a component of a UE (e.g., the UE 104, 350; the receiving entity 1004; the apparatus 1502; a processing system, which may include the memory 360 and which may be the entire UE 350 or a component of the UE 350, such as the TX processor 368, the RX processor 356, and/or the controller/processor 359). The method may enable a UE to receive SSBs with different periodicities from a base station based on one or more ES modes applied by the base station.

At 1402, the UE may receive an indication of a plurality of SSB Tx periodicities associated with a plurality of ES modes, such as described in connection with FIG. 10. For example, at 1012, the receiving entity 1004 (which may be a UE) may receive an indication 1008 from the transmitting entity 1002 indicating SSB Tx periodicities 1006 associated with the ES modes. The reception of the indication of the plurality of SSB Tx periodicities 1006 associated with the plurality of ES modes may be performed by, e.g., the SSB periodicity indication process component 1540 and/or the reception component 1530 of the apparatus 1502 in FIG. 10.

In one example, the indication may be received from a base station, a DU, or a CU. In such an example, the CU and/or the DU may be associated with an IAB network, or associated with one or more base stations.

In another example, the indication may be received in one or more formats of a SIB or an RRC message.

In another example, the UE may receive an indication of a switch from one of the plurality of ES modes to another of the plurality of ES modes.

In another example, the UE may receive an indication of each of a plurality of neighboring cells that are associated with one of the plurality of ES modes. In such an example, the indication may include one or more SMTC parameters. In such an example, the indication may include one or more scaling factors associated with one or more PCIs.

In another example, the plurality of SSB Tx periodicities may include IAB STC periodicities. In such an example, the IAB STC periodicities may be between 640 ms and 1280 ms.

In another example, the plurality of SSB Tx periodicities may include TRP SSB periodicities. In such an example, the TRP SSB periodicities may be configured to match the IAB STC periodicities. In such an example, the TRP SSB periodicities may have a maximum periodicity of 1280 ms.

In another example, the plurality of SSB Tx periodicities in a SIB1 may be configured to match a largest periodicity of the IAB STC periodicity.

At 1404, the UE may receive one or more SSBs based on one of the plurality of SSB Tx periodicities associated with one of the plurality of ES modes, such as described in connection with FIG. 10. For example, at 1016, the receiving entity 1004 may receive SSBs based on one of the plurality of SSB Tx periodicities 1006 associated with one of the plurality of ES modes. The reception of the SSBs may be performed by, e.g., the SSB process component 1542 and/or the reception component 1530 of the apparatus 1502 in FIG. 15.

Figure 15:
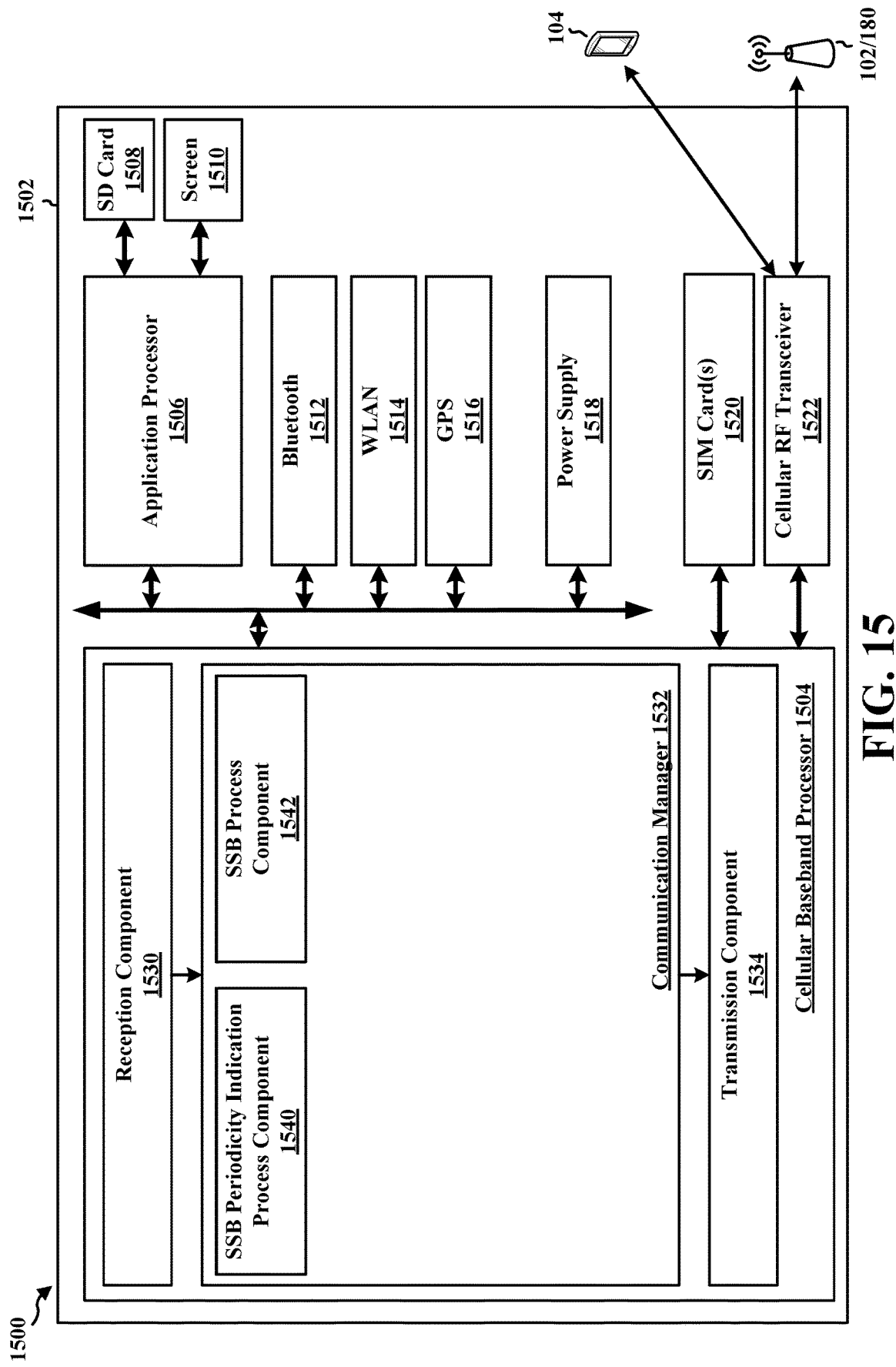
FIG. 15 is a diagram illustrating an example of a hardware implementation for an example apparatus in accordance with aspects presented herein.

FIG. 15 is a diagram 1500 illustrating an example of a hardware implementation for an apparatus 1502. The apparatus 1502 may be a UE, a component of a UE, or may implement UE functionality. In some aspects, the apparatus 1502 may include a cellular baseband processor 1504 (also referred to as a modem) coupled to a cellular RF transceiver 1522. In some aspects, the apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, or a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502.

The communication manager 1532 includes an SSB periodicity indication process component 1540 that is configured to receive an indication of a plurality of SSB Tx periodicities associated with a plurality of ES modes, e.g., as described in connection with 1402 of FIG. 14. The communication manager 1532 further includes an SSB process component 1542 that is configured to receive one or more SSBs based on one of the plurality of SSB Tx periodicities associated with one of the plurality of ES modes, e.g., as described in connection with 1404 of FIG. 14.

The apparatus may include additional components that perform each of the blocks of the algorithm in the flowchart of FIG. 14. As such, each block in the flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for receiving an indication of a plurality of SSB Tx periodicities associated with a plurality of ES modes (e.g., the SSB periodicity indication process component 1540 and/or the reception component 1530). The apparatus 1502 includes means for receiving one or more SSBs based on one of the plurality of SSB Tx periodicities associated with one of the plurality of ES modes (e.g., the SSB process component 1542 and/or the reception component 1530).

In one configuration, the indication may be received from a base station, a DU, or a CU.

In another configuration, the indication may be received in one or more formats of a SIB or an RRC message.

In another configuration, the apparatus 1502 includes means for receiving an indication of a switch from one of the plurality of ES modes to another of the plurality of ES modes.

In another configuration, the apparatus 1502 includes means for receiving an indication of each of a plurality of neighboring cells that are associated with one of the plurality of ES modes. In such a configuration, the indication may include one or more SMTC parameters. In such a configuration, the indication may include one or more scaling factors associated with one or more PCIs.

In another configuration, the plurality of SSB Tx periodicities may include IAB STC periodicities. In such a configuration, the IAB STC periodicities may be between 640 ms and 1280 ms.

In another configuration, the plurality of SSB Tx periodicities may include TRP SSB periodicities. In such a configuration, the TRP SSB periodicities may be configured to match the IAB STC periodicities. In such a configuration, the TRP SSB periodicities may have a maximum periodicity of 1280 ms.

In another configuration, the plurality of SSB Tx periodicities in a SIB1 may be configured to match a largest periodicity of the IAB STC periodicity.

The means may be one or more of the components of the apparatus 1502 configured to perform the functions recited by the means. As described supra, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to configure a plurality of SSB Tx periodicities associated with a plurality of ES modes; transmit an indication of the plurality of SSB Tx periodicities associated with the plurality of ES modes; and transmit one or more SSBs based on one of the plurality of SSB Tx periodicities associated with one of the plurality of ES modes.

Aspect 2 is the apparatus of aspect 1, further including a transceiver coupled to the at least one processor.

Aspect 3 is the apparatus of any of aspects 1 and 2, where the indication is transmitted from a CU to a DU or transmitted from a DU to a CU.

Aspect 4 is the apparatus of any of aspects 1 to 3, where the plurality of SSB Tx periodicities are associated with one or more cells or one or more TRPs of the DU.

Aspect 5 is the apparatus of any of aspects 1 to 4, where the indication is transmitted between CUs.

Aspect 6 is the apparatus of any of aspects 1 to 5, where the indication is transmitted to a UE or a MT.

Aspect 7 is the apparatus of any of aspects 1 to 6, where the indication is transmitted in one or more formats of a SIB or an RRC message.

Aspect 8 is the apparatus of any of aspects 1 to 7, where the at least one processor is further configured to: switch from one of the plurality of ES modes to another of the plurality of ES modes.

Aspect 9 is the apparatus of any of aspects 1 to 8, where the at least one processor is further configured to: transmit an indication of the switch from one of the plurality of ES modes to another of the plurality of ES modes.

Aspect 10 is the apparatus of any of aspects 1 to 9, where the at least one processor is further configured to: transmit an indication of each of a plurality of neighboring cells that are associated with one of the plurality of ES modes.

Aspect 11 is the apparatus of any of aspects 1 to 10, where the indication includes one or more SMTC parameters.

Aspect 12 is the apparatus of any of aspects 1 to 11, where the indication includes one or more scaling factors associated with one or more PCIs.

Aspect 13 is the apparatus of any of aspects 1 to 12, where the plurality of SSB Tx periodicities include IAB STC periodicities.

Aspect 14 is the apparatus of any of aspects 1 to 13, where the IAB STC periodicities are between 640 ms and 1280 ms.

Aspect 15 is the apparatus of any of aspects 1 to 14, where the plurality of SSB Tx periodicities include TRP SSB periodicities.

Aspect 16 is the apparatus of any of aspects 1 to 15, where the TRP SSB periodicities are configured to match the IAB STC periodicities.

Aspect 17 is the apparatus of any of aspects 1 to 16, where the TRP SSB periodicities have a maximum periodicity of 1280 ms.

Aspect 18 is the apparatus of any of aspects 1 to 17, where the plurality of SSB Tx periodicities in a SIB1 are configured to match a largest periodicity of the IAB STC periodicity.

Aspect 19 is the apparatus of any of aspects 1 to 18, where the plurality of SSB Tx periodicities in a SIB1 have a maximum periodicity of 1280 ms.

Aspect 20 is a method of wireless communication for implementing any of aspects 1 to 19.

Aspect 21 is an apparatus for wireless communication including means for implementing any of aspects 1 to 19.

Aspect 22 is a computer-readable medium storing computer executable code, where the code when executed by a processor causes the processor to implement any of aspects 1 to 19.

Aspect 23 is an apparatus for wireless communication including at least one processor coupled to a memory and configured to receive an indication of a plurality of SSB Tx periodicities associated with a plurality of ES modes; and receive one or more SSBs based on one of the plurality of SSB Tx periodicities associated with one of the plurality of ES modes.

Aspect 24 is the apparatus of aspect 23, further including a transceiver coupled to the at least one processor.

Aspect 25 is the apparatus of any of aspects 23 and 24, where the indication is received from a base station, a DU, or a CU.

Aspect 26 is the apparatus of any of aspects 23 to 25, where the indication is received in one or more formats of a SIB or an RRC message.

Aspect 27 is the apparatus of any of aspects 23 to 26, where the at least one processor is further configured to: receive an indication of a switch from one of the plurality of ES modes to another of the plurality of ES modes.

Aspect 28 is the apparatus of any of aspects 23 to 27, where the at least one processor is further configured to: receive an indication of each of a plurality of neighboring cells that are associated with one of the plurality of ES modes.

Aspect 29 is the apparatus of any of aspects 23 to 28, where the indication include s one or more SMTC parameters.

Aspect 30 is the apparatus of any of aspects 23 to 29, where the indication include s one or more scaling factors associated with one or more PCIs.

Aspect 31 is the apparatus of any of aspects 23 to 30, where the plurality of SSB Tx periodicities include IAB STC periodicities.

Aspect 32 is the apparatus of any of aspects 23 to 31, where the IAB STC periodicities are between 640 ms and 1280 ms.

Aspect 33 is the apparatus of any of aspects 23 to 32, where the plurality of SSB Tx periodicities include TRP SSB periodicities.

Aspect 34 is the apparatus of any of aspects 23 to 33, where the TRP SSB periodicities are configured to match the IAB STC periodicities.

Aspect 35 is the apparatus of any of aspects 23 to 34, where the TRP SSB periodicities have a maximum periodicity of 1280 ms.

Aspect 36 is the apparatus of any of aspects 23 to 35, where the plurality of SSB Tx periodicities in a SIB1 are configured to match a largest periodicity of the IAB STC periodicity.

Aspect 37 is a method of wireless communication for implementing any of aspects 23 to 36.

Aspect 38 is an apparatus for wireless communication including means for implementing any of aspects 23 to 36.

Aspect 39 is a computer-readable medium storing computer executable code, where the code when executed by a processor causes the processor to implement any of aspects 23 to 36.

What is claimed is:

1. An apparatus for wireless communication at a base station (BS), comprising:
    memory; and
    at least one processor coupled to the memory and configured to:
        configure a plurality of synchronization signal block (SSB) transmission (Tx) periodicities associated with a plurality of energy saving (ES) modes;
        transmit an indication of the plurality of SSB Tx periodicities associated with the plurality of ES modes, wherein the indication of the plurality of SSB Tx periodicities associated with the plurality of ES modes is transmitted from a central unit (CU) to a distributed unit (DU), from the DU to the CU, or between CUs; and
        transmit one or more SSBs based on one of the plurality of SSB Tx periodicities associated with one of the plurality of ES modes.

2. The apparatus of claim 1, wherein to transmit the indication, the at least one processor is configured to transmit the indication from the CU to the DU or from the DU to the CU.

3. The apparatus of claim 1, wherein the plurality of SSB Tx periodicities are associated with one or more cells or one or more transmission and reception points (TRPs) of the DU.

4. The apparatus of claim 1, wherein to transmit the indication, the at least one processor is configured to transmit the indication between the CUs.

5. The apparatus of claim 1, wherein the at least one processor is further configured to:
    switch from one of the plurality of ES modes to another of the plurality of ES modes.

6. The apparatus of claim 5, wherein the at least one processor is further configured to:
    transmit a second indication of the switch from one of the plurality of ES modes to another of the plurality of ES modes.

7. The apparatus of claim 1, wherein the at least one processor is further configured to:
    transmit a second indication of each of a plurality of neighboring cells that are associated with one of the plurality of ES modes.

8. The apparatus of claim 7, wherein the second indication includes one or more SSB-based measurement timing configuration (SMTC) parameters.

9. The apparatus of claim 7, wherein the second indication includes one or more scaling factors associated with one or more physical cell identifiers (PCIs).

10. The apparatus of claim 1, wherein the plurality of SSB Tx periodicities include integrated access and backhaul (IAB) SSB transmission configuration (STC) periodicities.

11. The apparatus of claim 10, wherein the IAB STC periodicities are between 640 microseconds (ms) and 1280 microseconds (ms).

12. The apparatus of claim 10, wherein the plurality of SSB Tx periodicities include transmission and reception point (TRP) SSB periodicities.

13. The apparatus of claim 12, wherein the TRP SSB periodicities are configured to match the IAB STC periodicities.

14. The apparatus of claim 12, wherein the TRP SSB periodicities have a maximum periodicity of 1280 microseconds (ms).

15. The apparatus of claim 10, wherein the plurality of SSB Tx periodicities in a system information block type1 (SIB1) are configured to match a largest periodicity of the IAB STC periodicity.

16. The apparatus of claim 1, further comprising a transceiver coupled to the at least one processor.

17. A method of wireless communication at a base station (BS), comprising:
    configuring a plurality of synchronization signal block (SSB) transmission (Tx) periodicities associated with a plurality of energy saving (ES) modes, wherein the indication of the plurality of SSB Tx periodicities associated with the plurality of ES modes is transmitted from a central unit (CU) to a distributed unit (DU), from the DU to the CU, or between CUs;
    transmitting an indication of the plurality of SSB Tx periodicities associated with the plurality of ES modes; and
    transmitting one or more SSBs based on one of the plurality of SSB Tx periodicities associated with one of the plurality of ES modes.

18. An apparatus for wireless communication at a user equipment (UE), comprising:
    memory; and
    at least one processor coupled to the memory and configured to:
        receive an indication of a plurality of synchronization signal block (SSB) transmission (Tx) periodicities associated with a plurality of energy saving (ES) modes wherein the plurality of SSB Tx periodicities include integrated access and backhaul (IAB) SSB transmission configuration (STC) periodicities; and
        receive one or more SSBs based on one of the plurality of SSB Tx periodicities associated with one of the plurality of ES modes.

19. The apparatus of claim 18, wherein to receive the indication, the at least one processor is configured to receive the indication from a base station, a distributed unit (DU), or a central unit (CU).

20. The apparatus of claim 18, wherein to receive the indication, the at least one processor is configured to receive the indication in one or more formats of a system information block (SIB) or a radio resource control (RRC) message.

21. The apparatus of claim 18, wherein the at least one processor is further configured to:
receive a second indication of a switch from one of the plurality of ES modes to another of the plurality of ES modes.

22. The apparatus of claim 18, wherein the at least one processor is further configured to:
receive a second indication of each of a plurality of neighboring cells that are associated with one of the plurality of ES modes.

23. The apparatus of claim 22, wherein the second indication includes one or more SSB-based measurement timing configuration (SMTC) parameters, or includes one or more scaling factors associated with one or more physical cell identifiers (PCIs).

24. The apparatus of claim 18, wherein the IAB STC periodicities are between 640 microseconds (ms) and 1280 microseconds (ms).

25. The apparatus of claim 18, wherein the plurality of SSB Tx periodicities include transmission and reception point (TRP) SSB periodicities, and wherein the TRP SSB periodicities are configured to match the IAB STC periodicities.

26. The apparatus of claim 18, wherein the plurality of SSB Tx periodicities in a system information block type1 (SIB1) are configured to match a largest periodicity of the IAB STC periodicity.

27. The apparatus of claim 18, further comprising a transceiver coupled to the at least one processor.

28. A method of wireless communication at a user equipment (UE), comprising:
receiving an indication of a plurality of synchronization signal block (SSB) transmission (Tx) periodicities associated with a plurality of energy saving (ES) modes, wherein the plurality of SSB Tx periodicities include integrated access and backhaul (IAB) SSB transmission configuration (STC) periodicities; and
receiving one or more SSBs based on one of the plurality of SSB Tx periodicities associated with one of the plurality of ES modes.

* * * * *